US008477789B2

(12) United States Patent
Hamamoto

(10) Patent No.: US 8,477,789 B2
(45) Date of Patent: Jul. 2, 2013

(54) TRANSMISSION DEVICE AND RECEPTION DEVICE

(75) Inventor: Yasuo Hamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 413 days.

(21) Appl. No.: 12/158,026

(22) PCT Filed: Dec. 20, 2006

(86) PCT No.: PCT/JP2006/325383
§ 371 (c)(1),
(2), (4) Date: Jun. 18, 2008

(87) PCT Pub. No.: WO2007/077739
PCT Pub. Date: Jul. 12, 2007

(65) Prior Publication Data
US 2009/0168791 A1    Jul. 2, 2009

(30) Foreign Application Priority Data
Dec. 28, 2005   (JP) .................................. 2005-377927

(51) Int. Cl.
*H04L 12/28*  (2006.01)
*H04L 12/56*  (2006.01)
*H04L 12/54*  (2006.01)
*H04L 7/00*   (2006.01)
*G06F 15/16*  (2006.01)

(52) U.S. Cl.
USPC ............ 370/395.62; 370/395.64; 370/395.65; 370/413; 370/429; 375/354; 709/231; 709/232

(58) Field of Classification Search
USPC ............... 370/394, 395.62–395.65, 412–429, 370/395.61–395.65; 375/354; 709/230–234
See application file for complete search history.

(56) References Cited

U.S. PATENT DOCUMENTS 5,541,852 A * 7/1996 Eyuboglu et al. ............. 709/232
5,565,924 A * 10/1996 Haskell et al. ............. 348/423.1
(Continued)

FOREIGN PATENT DOCUMENTS

| JP | 3-117219    | 5/1991 |
| JP | 5-183579    | 7/1993 |
| JP | 8-139704    | 5/1996 |
| JP | 2004-180127 | 6/2004 |

OTHER PUBLICATIONS

International Search Report issued Mar. 27, 2007 in the International (PCT) Application of which the present application is the U.S. National Stage.

*Primary Examiner* — Un C Cho
*Assistant Examiner* — Jeremy Costin
(74) *Attorney, Agent, or Firm* — Wenderoth, Lind & Ponack, L.L.P.

(57) ABSTRACT

A transmission device (100) outputs, to a reception device (200), a stored amount of packets in a first transmission buffer (105) just before a certain packet has been written to the first transmission buffer. A first reception buffer amount read unit (206) in the reception device reads a stored amount of packets in a first reception buffer just before the certain packet has been read from the first reception buffer. A storage amount addition unit (207) adds the stored amount of packets in the first transmission buffer and the stored amount of packets in the first reception buffer, and a correction unit (208) adjusts the frequency of a variable frequency oscillator in a reception timestamp timer 209 so that the resulting added value is a constant value.

1 Claim, 18 Drawing Sheets

U.S. PATENT DOCUMENTS

| | | | |
|---|---|---|---|
| 5,901,149 A * | 5/1999 | Itakura et al. | 370/468 |
| 6,188,700 B1 * | 2/2001 | Kato et al. | 370/477 |
| 6,504,850 B1 * | 1/2003 | Kato et al. | 370/465 |
| 6,744,782 B1 * | 6/2004 | Itakura et al. | 370/466 |
| 2004/0190459 A1 | 9/2004 | Ueda et al. | |
| 2004/0233932 A1 * | 11/2004 | Ohmi | 370/468 |
| 2004/0264454 A1 * | 12/2004 | Rajkumar et al. | 370/389 |
| 2005/0262261 A1 * | 11/2005 | Deshpande | 709/231 |

* cited by examiner

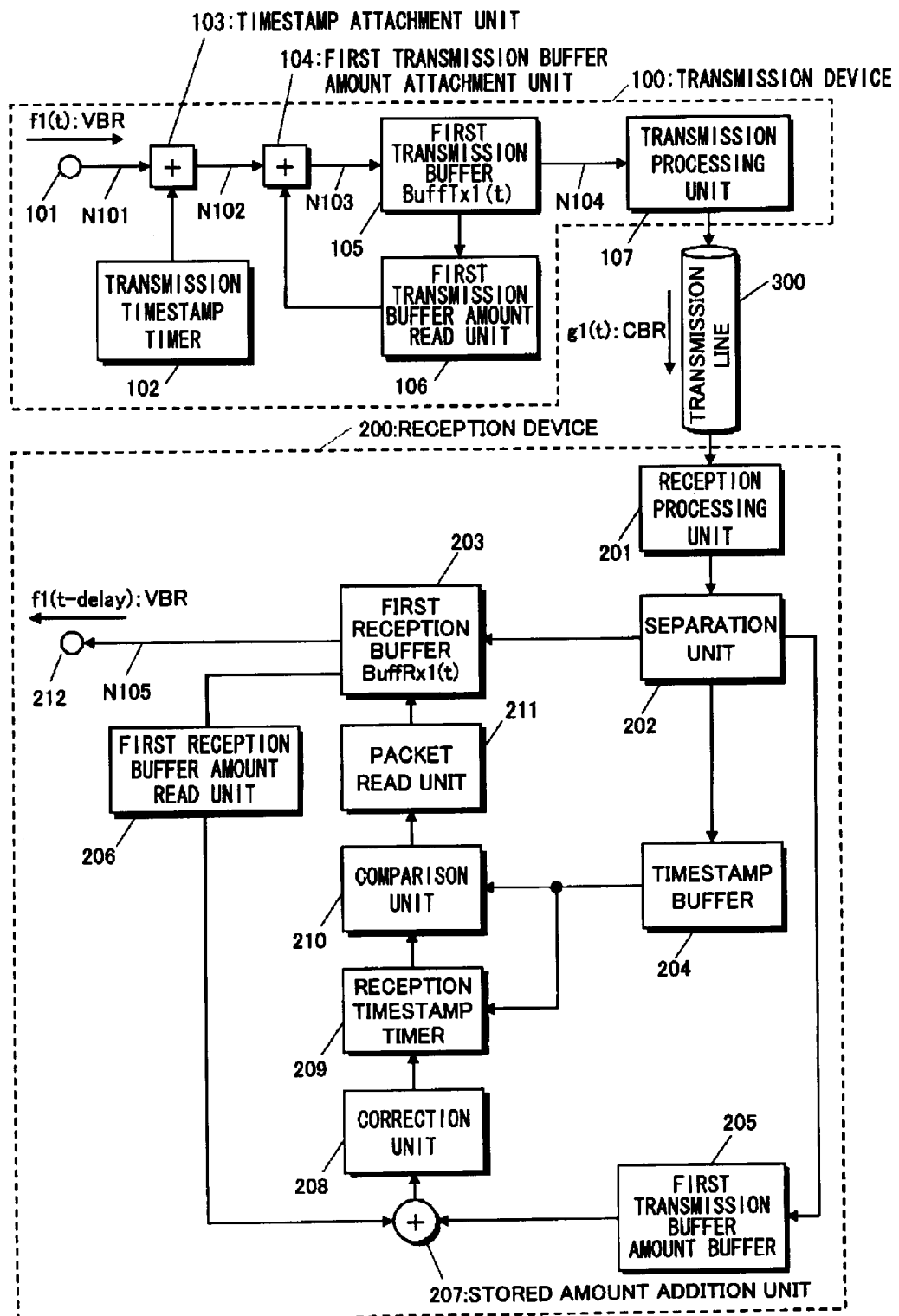

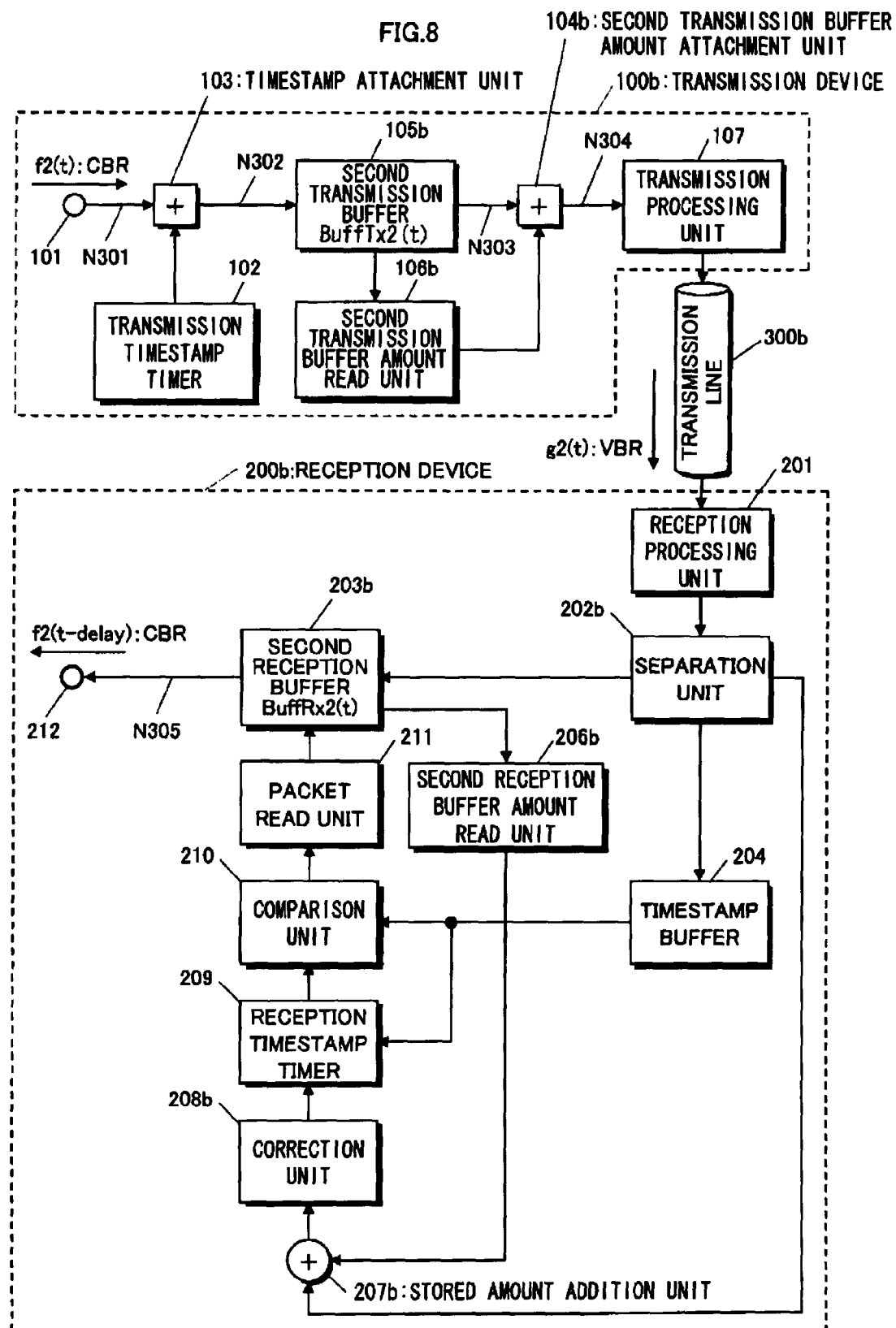

TRANSMISSION DEVICE AND RECEPTION DEVICE

TECHNICAL FIELD

The present invention relates to technology for performing synchronous transmission between a transmission device and a reception device, such as MPEG2 transport stream (MPEG2 TS) transmission.

Synchronous transmission refers to transmission in which the average bit rate at which packets are input to a transmission device is equal to the average bit rate at which packets are output from a reception device, and the time-base jitter of packets is within a predetermined range.

BACKGROUND ART

Conventionally, there is technology that realizes synchronous transmission by merely performing transmission jitter control with the use of a buffer included in a reception device, under the condition that the input bit rate at which packets are input to a transmission device and the transmission bit rate of packet on a transmission line are both a constant bit rate (CBR) and both the same value (see patent document 1).

In the embodiments of the present invention, "constant bit rate" means that the average bit rate per fixed period is a constant value, and "variable bit rate" means that the average bit rate per certain fixed period varies.

The following describes an outline of the technology disclosed in patent document 1 for realizing conventional synchronous transmission with reference to FIG. 17. FIG. 17 shows the structure of a reception device that realizes such conventional synchronous transmission.

A reception device 1000 includes an input terminal 1001 that receives an input of a packet from a transmission line, a conditioning circuit 1002 with a transmission jitter buffer (not depicted) provided therein, a system decoder 1003, a timestamp acquisition circuit 1004, a PLL (Phase Locked Loop) circuit 1005, an output terminal 1006 for externally outputting packets, and an output terminal 1007 for externally outputting a system clock.

In the following, BuffRx(t) is a stored amount function that expresses the amount of packets that are stored in the transmission jitter buffer in the conditioning circuit 1002 at time t. G(t) is a rate function that expresses the input bit rate at which a packet is input to the transmission jitter buffer at time t, and F(t) is a rate function that expresses the output bit rate at which a packet is output from the transmission jitter buffer at time t.

The rate function G(t) is 0 until time T0, and c (c being a constant value) at or after time T0, and the rate function F(t) is 0 until time T1, and c (c being a constant value) at or after time T1 (FIG. 18A).

The stored amount function BuffRx(t) at time t, which is at or after time T1, is expressed by the following expression (1)

Expression (1)

$$BuffRx(t) = \int_0^t G(t)dt - \int_0^t F(t)dt = \int_{T0}^{T1} G(t)dt + \int_{T1}^t G(t)dt - \int_{T1}^t F(t)dt = \int_{T0}^{T1} cdt + \int_{T1}^t cdt - \int_{T1}^t cdt = \int_{T0}^{T1} cdt = \text{constant value}$$

In expression (1), since the data amount of packets input to the buffer from time T1 to time t is the same as the data amount of packets output from the buffer during the same period, expression (1) shows that the stored amount function BuffRx(t) is constant from time T1 onward (FIG. 18B). In other words, the stored amount of packets in the buffer is constant.

In consideration of this, the conventional technology realizes synchronous transmission by controlling the speed at which packets are output from the buffer so that the stored amount of packets in the buffer is constant.

Patent document 1: Japanese Patent Application Publication No. H8-139704

DISCLOSURE OF THE INVENTION

Problems Solved by the Invention

However, the conventional technology cannot realize synchronous transmission between transmission and reception devices in cases of communication such as when the stored amount of packets in the buffer included in the reception device is not constant. Examples of such communication include (1) when the input bit rate at which packets are input to the transmission device is a variable bit rate (VBR) and the transmission bit rate on the transmission line is a constant bit rate, (2) when the input bit rate at which packets are input to the transmission device is a constant bit rate and the transmission bit rate on the transmission line is a variable bit rate, and (3) when the input bit rate at which packets are input to the transmission device and the transmission bit rate on the transmission line are both variable bit rates.

The following describes how the stored amount of packets in the buffer of a reception device is not constant in the above case (2), with reference to FIGS. 19A and 19B.

In this case, the rate function G(t) is 0 until time T0, and a variable value at or after time T0, and the rate function F(t) is 0 until time T1, and c (c being a constant value) at or after T1 (FIG. 19A).

The stored amount function BuffRx(t) at time t, which is at or after time T1, is expressed by the following expression (2)

Expression (2)

$$BuffRx(t) = \int_0^t G(t)dt - \int_0^t F(t)dt = \int_{T0}^{T1} G(t)dt + \int_{T1}^t G(t)dt - \int_{T1}^t F(t)dt = \int_{T0}^{T1} G(t)dt + \int_{T1}^t G(t)dt - \int_{T1}^t cdt = \text{variable value}$$

In expression (2), since the data amount of packets input to the buffer from time T1 to time t is not necessarily the same as the data amount of packets output from the buffer during the same period, expression (2) shows that the stored amount function BuffRx(t) is not constant from time T1 onward (FIG. 19B). In other words, the stored amount of packets in the buffer is not constant.

In view of the above, an aim of the present invention is to provide a transmission device, a reception device, a transmission method, and a reception method that, by utilizing the stored amount of packets in the buffers included in the transmission and reception devices, realize synchronous transmission between the transmission and reception devices even when either of, or both, the input bit rate at which packets are input to the transmission device and the transmission bit rate on the transmission line is a variable bit rate.

Means to Solve the Problems

In order to achieve the above aim, the present invention is a transmission device including: a transmission counter unit operable to count a constant frequency clock signal; a first transmission buffer unit operable to temporarily store a packet input thereto, and output the stored packet; and a transmission unit operable to (i) transmit the packet stored in the first transmission buffer unit and transmission counter information, the transmission counter information indicating a count value of the transmission counter unit when the packet was input to the transmission device, and (ii) transmit first transmission storage information via a transmission line, the first transmission storage information specifying a stored amount of packets in the first transmission buffer unit at a first timing pertaining to first processing performed on the packet with respect to the first transmission buffer unit.

The present invention is also a transmission method of (i) transmitting a packet stored in a first transmission buffer unit and transmission counter information indicating a count value of a transmission counter unit when the packet was input to a transmission device, and (ii) transmitting, via a transmission line, first transmission storage information for specifying a stored amount of packets in the first transmission buffer unit at a first timing pertaining to first processing performed on the packet with respect to the first transmission buffer unit.

The present invention is also a reception device including: a reception unit operable to receive, via a transmission line and from a transmission device including a transmission counter unit that counts a constant frequency clock signal and a first transmission buffer unit, (i) a packet, (ii) transmission counter information indicating a count value of the transmission counter unit when the packet was input to the transmission device, and (iii) first transmission storage information for specifying a stored amount of packets in the first transmission buffer unit at a first timing pertaining to first processing performed on the packet with respect to the first transmission buffer unit; a reception counter unit operable to count a clock signal at a counting speed that is variable; a first reception buffer unit operable to temporarily store the packet; a correction unit operable to correct the counting speed of the reception counter unit based on the first transmission storage information and first reception storage information, the first reception storage information specifying a stored amount of packets in the first reception buffer unit at a second timing pertaining to second processing performed on the packet with respect to the first reception buffer unit; and a first output control unit operable to control output of the packet from the first reception buffer unit based on the transmission counter information received by the reception unit and reception counter information indicating a count value of the reception counter unit.

The present invention is also a reception method used in a reception device which includes a reception counter unit that counts a clock signal at a counting speed that is variable, and a first reception buffer unit that temporarily stores a received packet, including the steps of: receiving, via a transmission line and from a transmission device including a transmission counter unit that counts a constant frequency clock signal and a first transmission buffer unit, (i) the packet, (ii) transmission counter information indicating a count value of the transmission counter unit when the packet was input to the transmission device, and (iii) first transmission storage information for specifying a stored amount of packets in the first transmission buffer unit at a first timing pertaining to first processing performed on the packet with respect to the first transmission buffer unit; correcting the counting speed of the reception counter unit based on the first transmission storage information and first reception storage information, the first reception storage information specifying a stored amount of packets in the first reception buffer unit at a second timing pertaining to second processing performed on the packet with respect to the first reception buffer unit; and performing first output control to control output of the packet from the first reception buffer unit based on the transmission counter information received in the receiving step and reception counter information indicating a count value of the reception counter unit.

Effects of the Invention

A combination of the transmission device and reception device of the present invention, or a combination of the transmission method and reception method of the present invention, enables adjusting the count speeds of the counters in the transmission and reception devices by utilizing the stored amount of packets in the first transmission buffer unit of the transmission device and the stored amount of packets in the second reception buffer unit of the reception device. This enables synchronous transmission between transmission and reception devices, even in the case of communication between transmission and reception devices in which synchronous communication could not be realized by utilizing solely the stored amount of packets in the buffer included in the reception device (i.e., the bit rate at which packets are input to the transmission device is a variable bit rate, or the transmission bit rate on the transmission line is a variable bit rate).

In the transmission device, the first transmission storage information may be the stored amount of packets in the first transmission buffer unit.

In the reception device, the first transmission storage information may be the stored amount of packets in the first transmission buffer unit, and the first reception storage information may be the stored amount of packets in the first reception buffer unit.

This structure enables the reception device to easily specify the stored amount of packets in the first transmission buffer unit.

The transmission device may further include a counter information attachment unit operable to attach the transmission counter information to the packet, wherein the transmission unit may perform the transmission of the packet and the transmission counter information by transmitting the packet to which the transmission counter information has been attached by the counter information attachment unit.

This structure enables the reception device to easily specify the counter information that corresponds to the packet and that is from when the packet was input to the transmission device.

The transmission device may further include a storage information attachment unit operable to attach the first transmission storage information to the packet, wherein the transmission unit may perform the transmission of the packet and the first transmission storage information by transmitting the packet to which the first transmission storage information has been attached by the storage information attachment unit.

This structure enables the reception device to easily specify the first transmission storage information that corresponds to the packet.

The transmission device may further include a number attachment unit operable to sequentially attach numbers to packets that are to be transmitted by the transmission unit, in an order in which the packets were input to the transmission device.

In the reception device, the reception unit may be further operable to receive, from the transmission device, sequential numbers that have been assigned to packets in the transmission device in an order in which the packets were input to the transmission device, the reception device may further include: a detection unit operable to detect a count of packets that were not received by the reception unit, based on the sequential numbers received by the reception unit, and the correction unit may correct the counting speed of the reception counter unit so as to obtain a constant value for a sum of the stored amount of packets in the first transmission buffer unit, the stored amount of packets in the first reception buffer unit, and a missing packet amount that is based on the detected count of packets that were not received by the reception unit.

A combination of the above transmission device and reception device enables realizing synchronous transmission between the transmission and reception devices even if a packet is lost on the transmission line.

In the transmission device, the first transmission buffer unit may output the stored packet at a constant bit rate, the transmission device may further include: a second transmission buffer unit operable to temporarily store the packet output from the first transmission buffer unit, the first timing pertaining to the first processing may be a timing pertaining to input processing, and the transmission unit may be further operable to transmit second transmission storage information, the second transmission storage information specifying a stored amount of packets in the second transmission buffer unit at a second timing pertaining to second processing, the second processing being processing for outputting the packet from the second transmission buffer unit.

In the reception device, the first timing pertaining to the first processing may be a timing pertaining to input processing, the reception unit may be further operable to receive second transmission storage information from the transmission device which further includes a second transmission buffer unit that temporarily stores the packet output from the first transmission buffer unit at a constant bit rate and outputs the stored packet, the second transmission storage information specifying a stored amount of packets in the second transmission buffer unit at a timing pertaining to processing for outputting the packet from the second transmission buffer unit, and the reception device may further include: a second reception buffer unit operable to temporarily store the packet and output the stored packet to the first reception buffer unit; and a second output control unit operable to control the output of the packet from the second reception buffer unit, based on the second transmission storage information and second reception storage information, the second reception storage information specifying a stored amount of packets in the second reception buffer unit at a timing pertaining to processing for inputting the packet to the second reception buffer unit.

A combination of the above transmission device and reception device enables realizing synchronous transmission between the transmission and reception devices even if the input bit rate at which packets are input to the transmission apparatus and the transmission bit rate on the transmission line are both variable bit rates.

In the transmission device, the first transmission buffer unit may output the stored packet at a constant bit rate, the transmission device may further include: a second transmission buffer unit operable to temporarily store the packet output from the first transmission buffer unit, and the first timing pertaining to the first processing is a timing pertaining to input processing.

In the reception device, the first timing pertaining to the first processing may be a timing pertaining to input processing, the transmission device may further include a second transmission buffer unit that temporarily stores the packet output from the first transmission buffer unit at a constant bit rate and outputs the stored packet, and the reception device may further include: a second reception buffer unit operable to temporarily store the packet and output the stored packet to the first reception buffer unit; and a second output control unit operable to control the output of the packet from the second reception buffer unit based on (i) the first transmission storage information for specifying the stored amount of packets in the first transmission buffer unit at the first timing pertaining to first processing performed on the packet with respect to the first transmission buffer unit, and (ii) the first reception storage information for specifying the stored amount of packets in the first reception buffer unit at the second timing pertaining to second processing performed on the packet with respect to the first reception buffer unit.

A combination of the above transmission device and reception device enables realizing synchronous transmission between the transmission and reception devices even if the input bit rate at which packets are input to the transmission apparatus and the transmission bit rate on the transmission line are both variable bit rates.

The transmission device may further include a second transmission buffer unit operable to temporarily store the input packet, and transmit the stored packet to the first transmission buffer unit at a constant bit rate.

The present invention is also a reception device including: a reception unit operable to receive, via a transmission line and from a transmission device including a transmission counter unit that counts a constant frequency clock signal, a first transmission buffer unit that temporarily stores a packet and outputs the stored packet at a constant bit rate, and a second transmission buffer unit that temporarily stores the packet output from the first transmission buffer unit, (i) the packet, (ii) transmission counter information indicating a count value of the transmission counter unit when the packet was input to the transmission device, and (iii) transmission storage information for specifying a stored amount of packets in the second transmission buffer unit at a timing pertaining to processing for outputting the packet from the second transmission buffer unit; a reception counter unit operable to count a clock signal at a counting speed that is variable; a first reception buffer unit operable to temporarily store the packet; a second reception buffer unit operable to temporarily store the packet and output the stored packet to the first reception buffer unit; a correction unit operable to correct the counting speed of the reception counter unit based on the transmission storage information and reception storage information, the reception storage information specifying a stored amount of packets in the second reception buffer unit at a timing pertaining to processing for inputting the packet to the second reception buffer unit; a first output control unit operable to control output of the packet from the first reception buffer unit, based on the transmission counter information received by the reception unit and reception counter information indicating a count value of the reception counter unit; and a second output control unit operable to control the output of the packet from the second reception buffer unit, based on the transmission storage information and the reception storage information.

A combination of the above transmission device and reception device enables realizing synchronous transmission between the transmission and reception devices even if the input bit rate at which packets are input to the transmission apparatus and the transmission bit rate on the transmission line are both variable bit rates.

The present invention is also a reception method used in a reception device which includes a reception counter unit that counts a clock signal at a counting speed that is variable, a first reception buffer unit that temporarily stores a packet, and a second reception buffer unit that temporarily stores the packet and outputs the stored packet to the first reception buffer unit, including the steps of: receiving, via a transmission line and from a transmission device including a transmission counter unit that counts a constant frequency clock signal, a first transmission buffer unit that temporarily stores the packet and outputs the stored packet at a constant bit rate, and a second transmission buffer unit that temporarily stores the packet output from the first transmission buffer unit, (i) the packet, (ii) transmission counter information indicating a count value of the transmission counter unit when the packet was input to the transmission device, and (iii) transmission storage information for specifying a stored amount of packets in the second transmission buffer unit at a timing pertaining to processing for outputting the packet from the second transmission buffer unit; correcting the counting speed of the reception counter unit based on the transmission storage information and reception storage information, the reception storage information specifying a stored amount of packets in the second reception buffer unit at a timing pertaining to processing for inputting the packet to the second reception buffer unit; performing first output control to control output of the packet from the first reception buffer unit, based on the transmission counter information received in the receiving step and reception counter information indicating a count value of the reception counter unit; and performing second output control to control the output of the packet from the second reception buffer unit, based on the transmission storage information and the reception storage information.

The above reception method enables realizing synchronous transmission between the transmission and reception devices even if the input bit rate at which packets are input to the transmission apparatus and the transmission bit rate on the transmission line are both variable bit rates.

BRIEF DESCRIPTION OF THE DRAWINGS

FIG. 1 shows the structure of a synchronous transmission system of embodiment 1;

FIG. 8 shows the structure of a synchronous transmission system of embodiment 3;

DESCRIPTION OF THE CHARACTERS

| | |
|---|---|
| 100 | transmission device |
| 101 | input terminal |
| 102 | transmission timestamp timer |
| 103 | timestamp attachment unit |
| 104 | first transmission buffer amount attachment unit |
| 105 | first transmission buffer |
| 106 | first transmission buffer amount buffer |
| 107 | transmission processing device |
| 200 | reception device |
| 201 | reception processing device |
| 202 | separation unit |
| 203 | first reception buffer |
| 204 | timestamp timer |
| 205 | first transmission buffer amount buffer |
| 206 | first reception buffer amount read unit |
| 207 | stored amount addition unit |
| 208 | correction unit |
| 209 | reception timestamp timer |
| 210 | comparison unit |
| 211 | packet read unit |
| 300 | transmission line |

DETAILED DESCRIPTION OF THE INVENTION

Embodiment 1

The following describes a synchronous transmission system pertaining to embodiment 1 of the present invention that realizes synchronous transmission between a transmission device and a reception device with reference to the drawings.

The present embodiment and the later-described embodiment 2 are directed at a case in which the input bit rate at which packets are input to the transmission device is a variable bit rate, and the transmission bit rate on the transmission line is a constant bit rate.

Synchronous Transmission System

The following describes the structure of the synchronous transmission system of the present embodiment with reference to FIG. 1. FIG. 1 shows the structure of the synchronous transmission system of the present embodiment.

In the synchronous transmission system, packets are transmitted and received between a transmission device 100 and a reception device 200 via a transmission line 300. The transmission line 300 is a transmission line in, for example, an ATM (Asynchronous Transfer Mode) network.

Stored Amount of Packets

Figure 2A:
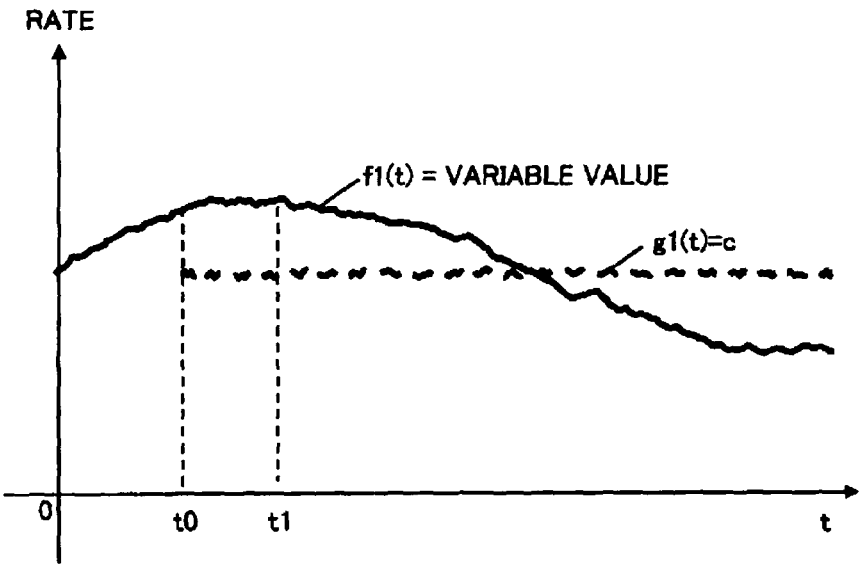
FIGS. 2A and 2B show changes in bit rate and stored amount of packets in a buffer over time in the synchronous transmission system of FIG. 1.
Figure 2B:
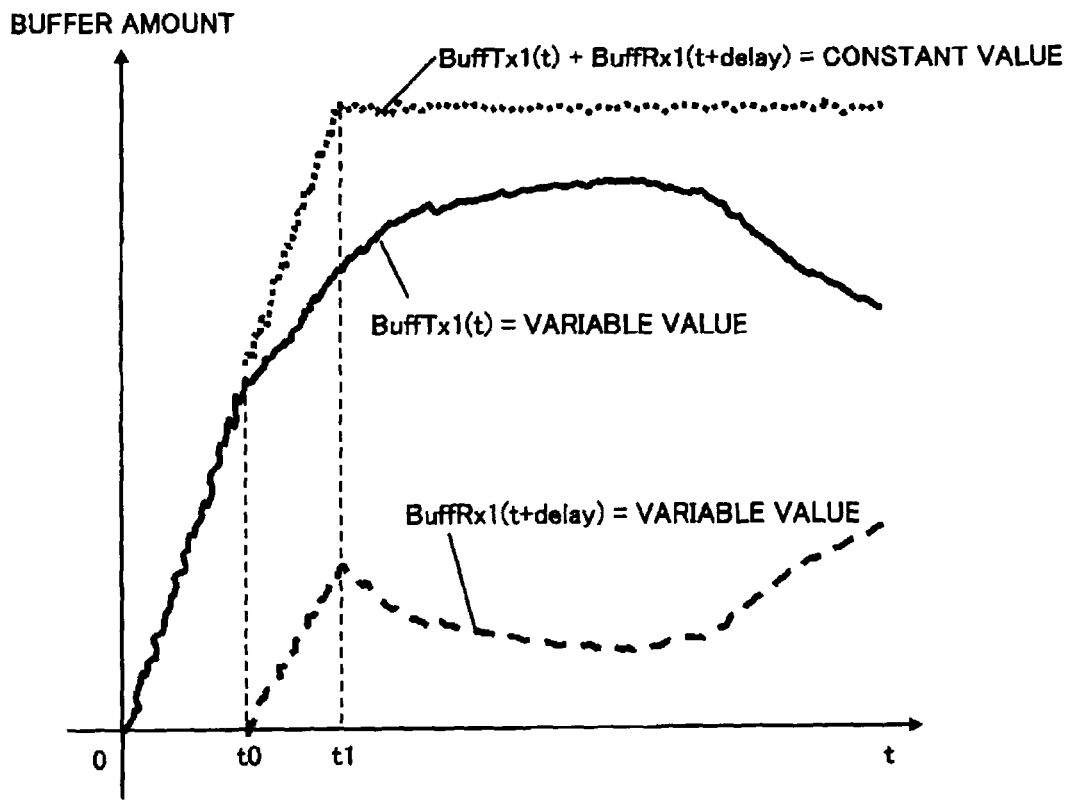

Prior to the description of the constituent elements shown in FIG. 1, the following describes the stored amount of packets in a first transmission buffer 105 and a first reception buffer 203 shown in FIG. 1, with reference to FIGS. 2A and 2B. FIGS. 2A and 2B show changes in bit rate and stored amount of packets over time in the synchronous transmission system of FIG. 1.

The input bit rate at which packets are input to the first transmission buffer 105 of the transmission device 100 is a variable bit rate, and is expressed by a rate function $f1(t)$. Also, the transmission bit rate on the transmission line is a constant bit rate, and is expressed by a rate function $g1(t)$.

In synchronous transmission, the output bit rate at which packets are output from the first reception buffer 203 of the reception device 200 is controlled so as to be equal to the input bit rate at which packets are input to the first transmission buffer 105. For this reason, letting "delay" express a delay time from when a packet is input to the transmission device 100 until when a packet is output from the reception device 200, the rate function $f1(t-delay)$ expresses the output bit rate at which packets are output from the first reception buffer 203.

Here, (1) packet writing to the first transmission buffer 105 is begun at time 0, (2) packet reading from the first transmission buffer 105 and packet writing to the first reception buffer 203 are begun at time t0, and (3) packet reading from the first reception buffer 203 is begun at time t1 (=delay).

In this case, the rate function $f1(t)$ is a variable value, and the function $g1(t)$ is 0 until time t0, and c (c being a constant value) at and after time t0 (FIG. 2A). Note that the function $f1(t-delay)$ is 0 until time t1 (=delay), and a variable value at and after time t1.

Letting $BuffTx1(t)$ be a stored amount function expressing the stored amount of packets in the first transmission buffer 105 at time t, the following expression (3) indicates the stored amount function $BuffTx1(t)$ at time t, which is at or after time t1 (FIG. 2B).

Expression (3)

$$BuffTx1(t) = \int_0^t f1(t)dt - \int_0^t g1(t)dt = \int_0^t f1(t)dt - \int_{t0}^t cdt \quad (3)$$

Letting $BuffRx1(t)$ be a stored amount function expressing the stored amount of packets in the first reception buffer 203 at time t, the following expression (4) indicates the stored amount function $BuffRx1(t)$ at time t, which is at or after time t1 (FIG. 2B)

Expression (4)

$$BuffRx1(t) = \int_0^t g1(t)dt - \int_0^t f1(t-\text{delay})dt = \int_{t0}^t cdt - \int_{\text{delay}}^t f1(t-\text{delay})dt \quad (4)$$

Based on expressions (3) and (4), the following expression (5) indicates a sum of the stored amount of packets in the first transmission buffer 105 at time t, which is at or after time t1, and the stored amount of packets in the first reception buffer 203 at time t+delay.

Expression (5)

$$BuffTx1(t) + BuffRx1(t+\text{delay}) = \quad (5)$$
$$\int_0^t f1(t)dt - \int_{t0}^t cdt + \int_{t0}^{t+\text{delay}} cdt - \int_{\text{delay}}^{t+\text{delay}} f1(t-\text{delay})dt =$$
$$\int_0^t f1(t)dt + \int_t^{t+\text{delay}} cdt - \int_0^t f1(t)dt =$$
$$\int_t^{t+\text{delay}} cdt = \text{constant value}$$

As shown above, the sum of the stored amount of packets in the first transmission buffer 105 at time t, which is at or after time t1, and the stored amount of packets in the first reception buffer 203 at time t+delay is a constant value (FIG. 2B).

In other words, a constant value is obtained for the sum of the stored amount of packets in the first transmission buffer 105 just before a certain packet is written to the first transmission buffer 105 and the stored amount of packets in the first reception buffer 203 just before the certain packet is read from the first reception buffer 203. Also, a constant value is obtained for the sum of the stored amount of packets in the first transmission buffer 105 just after a certain packet has been written to the first transmission buffer 105 and the stored amount of packets in the first reception buffer 203 just after the certain packet has been read from the first reception buffer 203.

In the present embodiment, synchronous transmission between the transmission device 100 and reception device 200 is realized by utilizing the above relationship in which the sum of the stored packet amounts is constant.

The present embodiment makes use of the sum of the stored amount of packets in the first transmission buffer 105 just before a certain packet is written to the first transmission buffer 105 and the stored amount of packets in the first reception buffer 203 just before the certain packet is read from the first reception buffer 203.

Note that it is acceptable to use the sum of the stored amount of packets in the first transmission buffer 105 just after a certain packet has been written to the first transmission buffer 105 and the stored amount of packets in the first reception buffer 203 just after the certain packet has been read from the first reception buffer 203.

Although it is desirable to use either of the above sums to realize synchronous transmission, when a sufficient amount of packets is stored in the first transmission buffer 105 and the first reception buffer 203, there may be a slight difference in the timing at which the stored amounts of the first transmission buffer 105 and the first reception buffer 203 are acquired.

Transmission Device

The transmission device 100 includes an input terminal 101, a transmission timestamp timer 102, a timestamp attachment unit 103, a first transmission buffer amount attachment unit 104, the first transmission buffer 105, a first transmission buffer amount read unit 106, and a transmission processing unit 107.

When a packet is input to the input terminal 101, the input packet is output to the timestamp attachment unit 103.

The transmission timestamp timer 102 counts a constant frequency clock signal and outputs a count value. An exemplary structure of the transmission timestamp timer 102 is described later with reference to FIG. 4.

The timestamp attachment unit 103 receives the input packet and attaches a count value, which is supplied from the transmission timestamp timer 102, to the beginning of the received packet as a timestamp. Note that in the present embodiment, although the count value is directly used as the timestamp, the count value may be substituted with a time, and information indicating the substituted time may be used as the timestamp.

The first transmission buffer amount attachment unit 104 attaches a later-described first transmission buffer amount, which is input from the first transmission buffer amount read unit 106, to the beginning of the packet having the timestamp attached thereto.

The first transmission buffer 105 is constituted from a FIFO (First In First Out) buffer. The first transmission buffer 105 temporarily stores input packets, and outputs the stored packets at a constant bit rate. Note that the first transmission buffer 105 joins a plurality of packets together and outputs the group of packets (hereinafter, called the "joined packet") in order to increase transmission efficiency.

The first transmission buffer amount read unit 106 reads the stored amount of packets in the first transmission buffer 105 (hereinafter, called the "first transmission buffer amount"), and outputs the first transmission buffer amount to the first transmission buffer amount attachment unit 104. Here, the first transmission buffer amount is the stored amount of packets in the first transmission buffer 105 just before the writing, to the first transmission buffer 105, of the packet to which the first transmission buffer amount is to be attached by the first transmission buffer amount attachment unit 104.

In order to facilitate processing in the reception device 200, the first transmission buffer amount is the stored amount of data in the first transmission buffer 105 excluding the data amounts of the timestamp and the first transmission buffer amount itself.

The first transmission buffer amount can be calculated in, for example, the following way. The data size of the timestamp and the first transmission buffer amount are assumed to be fixed data sizes. The sum of the data sizes of the timestamp and the first transmission buffer amount is multiplied by the number of packets stored in the first transmission buffer 105 (a value equaling the number of input packets minus the number of output packets). The value resulting from the multiplication is subtracted from the actual stored amount of the first transmission buffer 105. The value resulting from the subtraction is the first transmission buffer amount.

The transmission processing unit 107 performs modulation processing, protocol processing, address header processing, etc. suitable for transmission. A description of the modulation processing, protocol processing, address header processing, etc. has been omitted since they are not directly related to the present invention. It should be noted that the present invention can be applied to any kind of transmission, regardless of the modulation processing, protocol processing, address header processing, etc.

In the above-described transmission device 100, when a packet is input to the input terminal 101 (N101 of FIG. 3), the timestamp attachment unit 103 attaches a count value supplied from the transmission timestamp timer 102 to the beginning of the input packet as a timestamp (N102), and furthermore, the first transmission buffer amount attachment unit 104 attaches a first transmission buffer amount read by the first transmission buffer amount read unit 106 to the beginning of the packet having the timestamp attached thereto (N103). The packet having attached the timestamp and first transmission buffer amount attached thereto is stored in the first transmission buffer 105.

The first transmission buffer 105 outputs the joined packet (N104). The transmission processing unit 107 performs predetermined processing on the joined packet, and the resulting packet is sent to the transmission line 300.

Transmission Timestamp Timer

Figure 4:
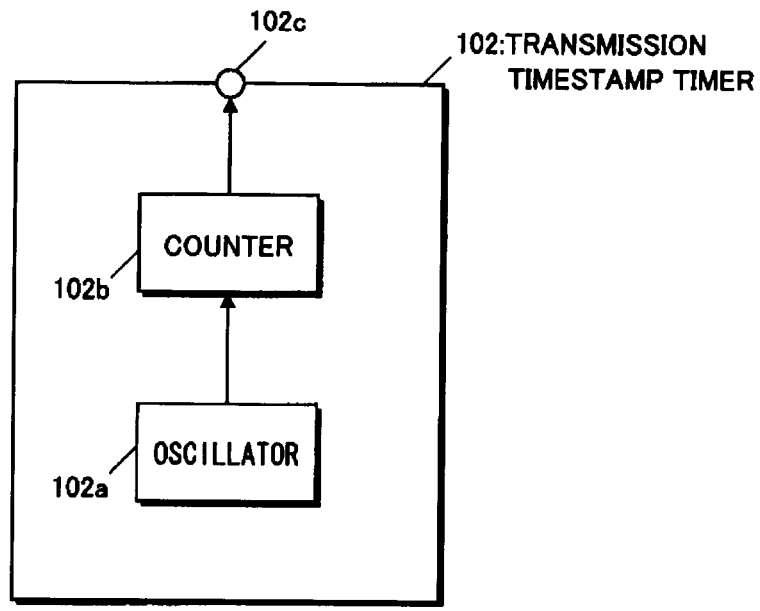
FIG. 4 shows the structure of a transmission timestamp timer shown in FIG. 1.

The following describes the structure of the transmission timestamp timer 102 included in the transmission device 100 shown in FIG. 1, with reference to FIG. 4. FIG. 4 shows the structure of the transmission timestamp timer 102 shown in FIG. 1.

The transmission timestamp timer 102 includes an oscillator 102a, a counter 102b, and an output terminal 102c.

The oscillator 102a is a constant frequency oscillator, and is constituted so as to generate a constant frequency clock signal with use of quartz or the like. The oscillation frequency is set high enough that the residual time-base jitter of a post-cycle recovery packet is within a predetermined amount.

The counter 102b counts the constant frequency clock signal generated by the oscillator 102a, and externally outputs a count value via the output terminal 102c. The count value output via the output terminal 102c is supplied to the timestamp attachment unit 103.

Reception Device

The reception device 200 performs time-base recovery processing, rate control processing and the like, which are conditions of synchronous transmission. Note that time-base recovery processing is processing for keeping the time-base jitter of packets within a predetermined range. Also, rate control processing is processing for equalizing the average bit rate of transmitted packets between transmission and reception devices.

The reception device 200 includes a reception processing unit 201, a separation unit 202, the first reception buffer 203, a timestamp buffer 204, a first transmission buffer amount buffer 205, a first reception buffer amount read unit 206, a stored amount addition unit 207, a correction unit 208, a reception timestamp timer 209, a comparison unit 210, a packet read unit 211, and an output terminal 212.

Upon receiving a packet via the transmission line 300, the reception processing unit 201 performs processing that is opposite from the processing performed by the transmission processing unit 107, and recovers the joined packet. A description of the processing performed by the reception processing unit 201 has been omitted since it does not directly relate to the present invention.

The separation unit 202 separates the joined packet received from the reception processing unit 201 into a plurality of first transmission buffer amounts, a plurality of timestamps, and a plurality of packets. The separation unit 202 outputs the first transmission buffer amounts, timestamps, and packets to the first transmission buffer amount buffer 205, timestamp buffer 204, and first reception buffer 203 respectively.

The first reception buffer 203 is constituted from a FIFO buffer, and temporarily stores input packets. Packets output from the first reception buffer 203 are externally sent via the output terminal 212.

The timestamp buffer 204 is constituted from a FIFO buffer, and temporarily stores input timestamps.

The first transmission buffer amount buffer 205 is constituted from a FIFO buffer, and temporarily stores input first transmission buffer amounts.

The first reception buffer amount read unit 206 reads the stored amount of packets in the first reception buffer 203 (hereinafter, called the "first reception buffer amount"), and outputs the read first reception buffer amount to the stored amount addition unit 207. The first reception buffer amount is the stored amount of packets in the first reception buffer 203 just before the reading from the first reception buffer 203 of the packet having attached thereto the first transmission buffer amount that was output to the stored amount addition unit 207 by the first transmission buffer amount buffer 205.

The stored amount addition unit 207 adds the first transmission buffer amount that was retrieved from the first transmission buffer amount buffer 205 and the first reception buffer amount that was received from the first reception buffer amount read unit 206. Note that since both the first reception buffer 203 and the first transmission buffer amount buffer 205 are constituted from FIFO buffers, the first transmission buffer amount retrieved from the first transmission buffer amount buffer 205 is the first transmission buffer amount that is attached to the packet to be read from the first reception buffer 203.

The correction unit 208 controls the counting speed of the reception timestamp timer 209 so that the added value received as input from the stored amount addition unit 207 is constant.

If the added value increases, the counting speed of the reception timestamp timer 209 has become slower than the counting speed of the transmission timestamp timer 102. The correction unit 208 therefore outputs a control signal instructing the reception timestamp timer 209 to increase the counting speed.

If the added value decreases, the counting speed of the reception timestamp timer 209 has become faster than the counting speed of the transmission timestamp timer 102. The correction unit 208 therefore outputs a control signal instructing the reception timestamp timer 209 to decrease the counting speed.

The reception timestamp timer 209 decreases the counting speed upon receiving an input of the control signal instructing a reduction in counting speed, and increases the counting speed upon receiving an input of the control signal instructing an increase in counting speed. Furthermore, the reception timestamp timer 209 is preset such that when the count value of the transmission timestamp timer 102 and the count value of the reception timestamp timer 209 are seen as the same time, the count value of the reception timestamp timer 209 is made smaller than the count value of the reception timestamp timer 102 by an amount that corresponds to a fixed delay time. Note that an exemplary structure of the reception timestamp timer 209 is described further below with reference to FIG. 5.

The comparison unit 210 compares the count value indicated by the timestamp received from the timestamp buffer 204 and the count value received from the reception timestamp timer 209, and if the received count values match, the comparison unit 210 outputs a packet read signal for instructing the packet read unit 211 to read a packet. Note that since the first reception buffer 203 and the timestamp buffer 204 are constituted from FIFO buffers, the timestamp that is retrieved from the timestamp buffer 204 is the timestamp that is attached to the packet that is to be read from the first reception buffer 203.

The packet read unit 211 receives the packet read signal from the comparison unit 210, and thereafter causes the first reception buffer 203 to output one packet.

Reception Timestamp Timer

Figure 5:
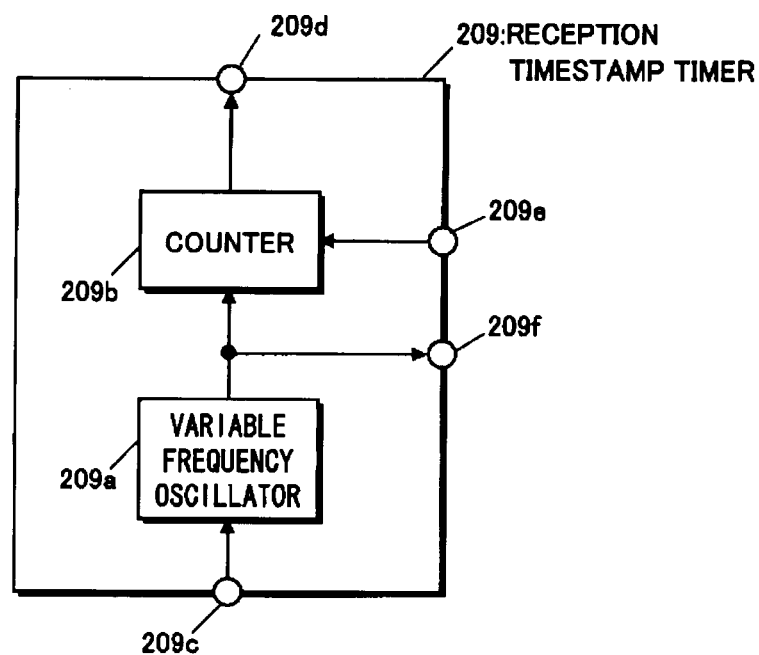
FIG. 5 shows the structure of a reception timestamp timer shown in FIG. 1.

The following describes the structure of the reception timestamp timer 209 included in the reception device 200 of FIG. 1, with reference to FIG. 5. FIG. 5 shows the structure of the reception timestamp timer 209 shown in FIG. 1.

The reception timestamp timer 209 includes a variable frequency oscillator 209*a*, a counter 209*b*, a control terminal 209*c*, a count value output terminal 209*d*, an initial value input terminal 209*e*, and a clock output terminal 209*f*.

The variable frequency oscillator 209*a* can oscillate at frequencies within a predetermined range. The variable frequency oscillator 209*a* supplies a clock signal at the oscillated frequency to the counter 209*b*, as well as externally outputs the clock signal via the clock output terminal 209*f*.

The variable frequency oscillator 209*a* increases the oscillation frequency upon receiving, from the control terminal 209*c*, a control signal that is an instruction to increase the count speed, and decreases the oscillation frequency upon receiving a control signal that is an instruction to decrease the count speed.

The counter 209*b* retrieves, from the timestamp buffer 204 via the input terminal 209*e*, the timestamp that was stored first in the timestamp buffer 204, and is preset based on the count value indicated by the retrieved timestamp.

Note that since a packet received by the transmission device 100 is output from the reception device 200 at a delay equal to a transmission fixed delay time, the counter 209*b* must output a count value while maintaining an offset, with respect to the counter 102*b*, that corresponds to the transmission fixed delay time. The counter 209*b* is therefore preset such that when the count value of the counter 102*b* and the count value of the counter 209*b* are seen as the same time, the count value of the counter 209*b* is made smaller than the count value of the counter 102*b* by an amount that corresponds to the transmission fixed delay time.

The counter 209*b* counts the clock signal generated by the variable frequency oscillator 209*a*, and externally outputs the count value via the count value output terminal 209*d*. The count value output via the count value output terminal 209*d* is supplied to the comparison unit 210.

Time-Base Recovery Processing

The counter 209*b* that has been preset as described above counts the clock signal generated by the variable frequency oscillator 209*a*, and outputs a count value to the comparison unit 210 via the count value output terminal 209*d*.

The comparison unit 210 compares the count value indicated by the timestamp retrieved from the timestamp buffer 204 and the count value received from the reception timestamp timer 209, and if both count values match, the comparison unit 210 outputs the packet read signal to the packet read unit 211. Upon receiving the packet read signal from the comparison unit 210, the packet read unit 211 causes the first reception buffer 203 to output one packet.

Figure 3:
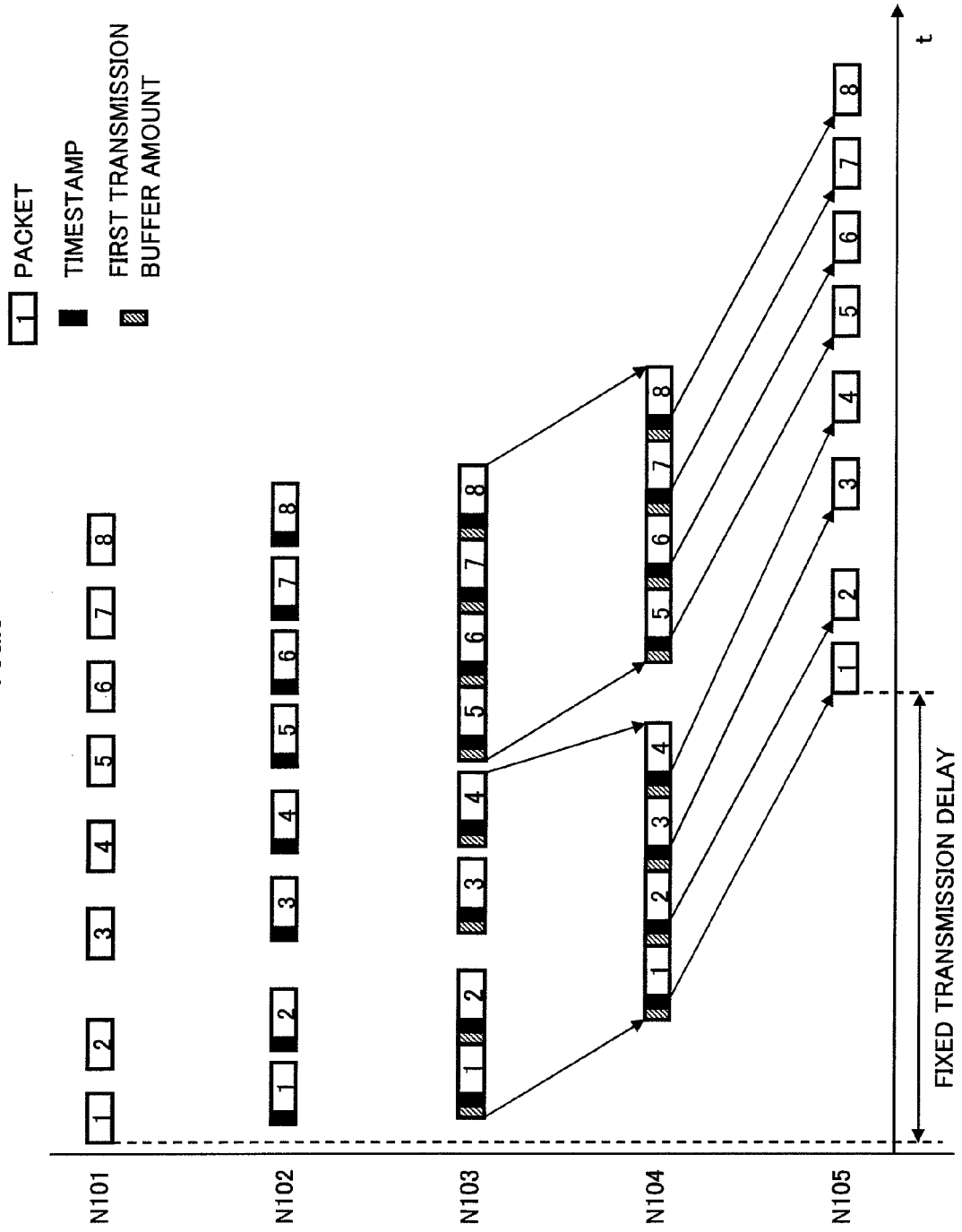
FIG. 3 shows changes in packet structure over time in the synchronous transmission system of FIG. 1.

According to this processing, as indicated by N105 in FIG. 3, the time-base of the packet is recovered, and the packet is output from the reception device 200 at the transmission fixed delay time with respect to reception by the transmission device 100.

It should be noted that the output of packets from the reception device 200 is controlled with use of a count value obtained by counting a limited frequency. For this reason, if the clock signal used for counting in the transmission timestamp timer 102 and the reception timestamp timer 209 is asynchronous with the clock signal for processing, the packet will be output from the reception device 200 with residual jitter that equals one or two clocks of the clock signal used for counting in the transmission timestamp timer 102 and the reception timestamp timer 209.

Rate Control Processing

The first reception buffer amount read unit 206 reads the first reception buffer amount of the first reception buffer 203, and outputs the read first reception buffer amount to the stored amount addition unit 207. The stored amount addition unit 207 retrieves the first transmission buffer amount from the first transmission buffer amount buffer 205.

The stored amount addition unit 207 adds the first transmission buffer amount retrieved from the first transmission buffer amount buffer 205 and the first reception buffer amount received from the first reception buffer amount read unit 206.

If the result of the addition increases, the correction unit 208 outputs a control signal for instructing the reception timestamp timer 209 to increase the counting speed. Upon receiving this control signal, the reception timestamp timer 209 increases the counting speed.

If the result of the addition decreases, the correction unit 208 outputs a control signal for instructing the reception timestamp timer 209 to decrease the counting speed. Upon receiving this control signal, the reception timestamp timer 209 decreases the counting speed.

The present embodiment as described above enables realizing synchronous transmission between a transmission device and a reception device even if the input bit rate at which packets are input to the transmission device is a variable bit rate and the transmission bit rate on the transmission line is a constant bit rate.

Supplementary Remarks (1) In the first embodiment and the hereinafter-described embodiment, the stored amounts of packets to which timestamps and transmission buffer amounts have not been attached are used as the stored amount of packets in the first reception buffer 203 and stored amount of packets in the first transmission buffer 105 used in the correction of the counting speed in the reception timestamp timer 209. However, the present invention is not limited to this. The stored amounts of packets may include either, or both, timestamps and transmission buffer amounts.

(2) In the first embodiment and the hereinafter-described embodiment, the frequency of the clock signal generated by the variable frequency oscillator 209a is controlled so as to enable changing the counting speed of the reception timestamp timer 209. However, the counting speed of the reception timestamp timer 209 may be changed by making the frequency of the clock signal a constant frequency and changing the method by which the counter 209b performs counting.

Embodiment 2

The following describes a synchronous transmission system pertaining to embodiment 2 of the present invention that realizes synchronous transmission between a transmission device and a reception device, with reference to the drawings.

The present embodiment is the same as embodiment 1, with the addition of a function for realizing synchronous transmission between transmission and reception devices even if a packet is lost on the transmission line.

Note that the same reference characters have been given to constituent elements of embodiment 2 that are substantially the same as embodiment 1, and descriptions thereof have been omitted since the descriptions in embodiment 1 are applicable.

Synchronous Transmission System

Figure 6:
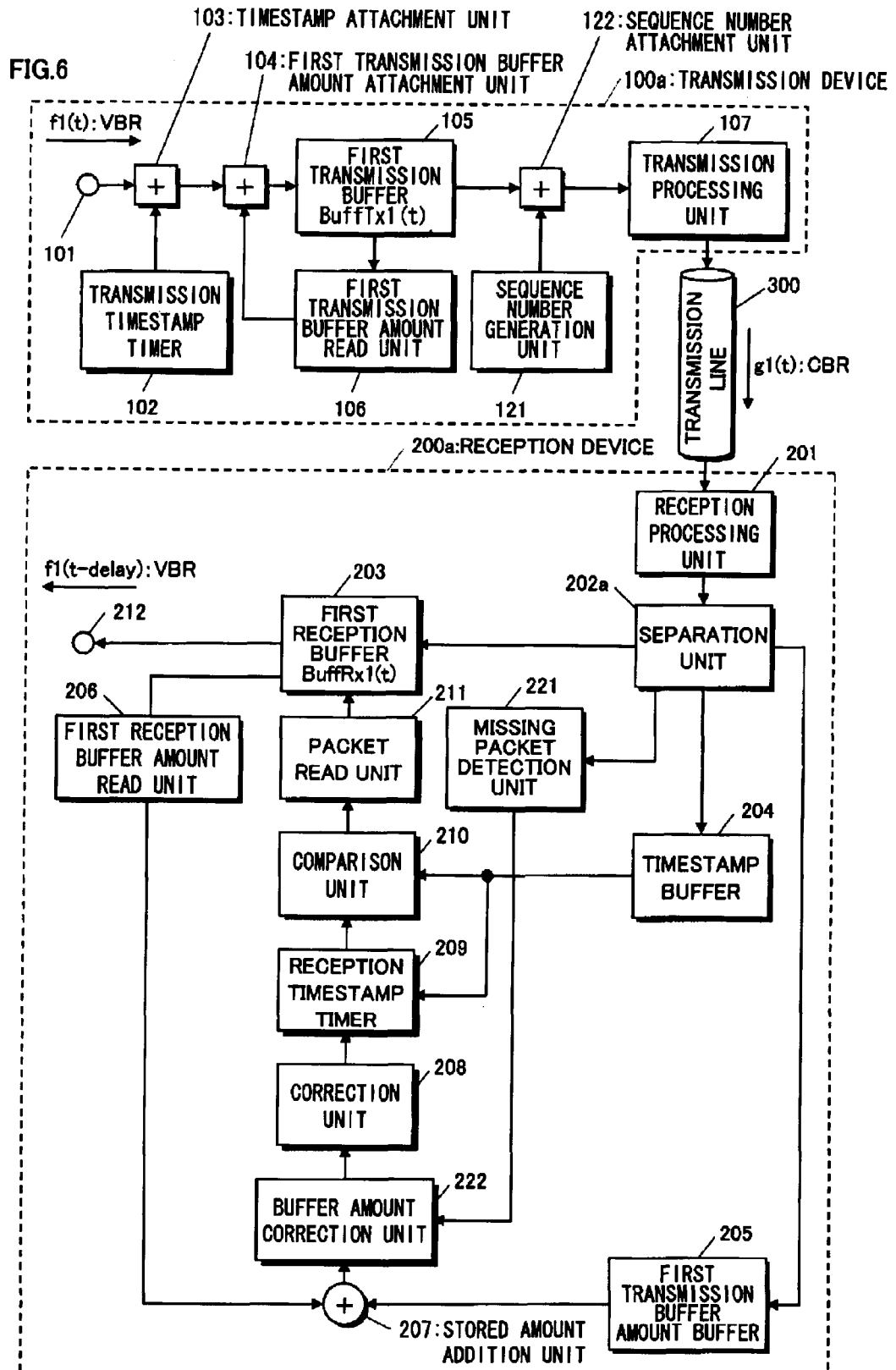
FIG. 6 shows the structure of a synchronous transmission system of embodiment 2.

The following describes the structure of the synchronous transmission system of the present embodiment with reference to FIG. 6. FIG. 6 shows the structure of the synchronous transmission system of the present embodiment.

A transmission device 100a and a reception device 200a transmit and receive packets via the transmission line 300. Note that packets input to the transmission device 100a have a fixed length.

Transmission Device

The transmission device 100a has the same structure as the transmission device 100 of embodiment 1, with the addition of a sequence number generation unit 121 and a sequence number attachment unit 122.

The sequence number generation unit 121 sequentially generates numbers beginning from a value of "1" (hereinafter, called a "sequence number"), and supplies the generated sequence number to the sequence number attachment unit 122.

The sequence number attachment unit 122 attaches the sequence number supplied from the sequence number generation unit 121 to the beginning of a joined packet output from the first transmission buffer 105.

In the transmission device 100a, when a packet is input to the input terminal 101, the timestamp attachment unit 103 attaches the count value supplied from the transmission timestamp timer 102 to the beginning of the input packet as a timestamp, and furthermore, the first transmission buffer amount attachment unit 104 attaches the first transmission buffer amount read by the first transmission buffer amount read unit 106 to the beginning of the packet having the timestamp attached thereto. The packet having the timestamp and first transmission buffer amount attached thereto is stored in the first transmission buffer 105.

The first transmission buffer 105 outputs a joined packet composed of a fixed number of packets that have been joined together. The sequence number attachment unit 122 attaches the sequence number supplied from the sequence number generation unit 121 to the beginning of the joined packet output from the first transmission buffer 105. The transmission processing unit 107 performs predetermined processing on the joined packet having the sequence number attached thereto, and outputs the resulting packet to the transmission line.

Reception Device

The reception device 200a has the same structure as the reception device 200 of embodiment 1, with the addition of a missing packet detection unit 221 and a buffer amount correction unit 222, and a separation unit 202a instead of the separation unit 202.

The separation unit 202a receives the joined packet having the sequence number attached thereto from the reception processing unit 201, and separates the received joined packet into the sequence number, a plurality of first transmission buffer amounts, a plurality of timestamps, and a plurality of packets. The separation unit 202a outputs the sequence number, first transmission buffer amounts, timestamps, and packets to the missing packet detection unit 221, the first transmission buffer amount buffer 205, the timestamp buffer 204, and the first reception buffer 203 respectively.

The missing packet detection unit 221 detects, based on the sequence number received from the separation unit 202a, the number of packets that were lost on the transmission line between the received joined packet and the joined packet that was received immediately therebefore, and outputs the detected number of missing packets to the buffer amount correction unit 222. Note that an exemplary structure of the missing packet detection unit 221 is described later with reference to FIG. 7.

With reference to the number of missing packets received from the missing packet detection unit 221, the buffer amount correction unit 222 stores "missing" in correspondence with a sequence number (to indicate that the joined packet having that sequence number attached thereto was not received) or "received" in correspondence with a sequence number (to indicate that the joined packet having that sequence number attached thereto was received).

For example, if 1, 0, 2, and 0 are received from the missing packet detection unit 221 as the numbers of missing joined packets, the buffer amount correction unit 222 stores "missing" in correspondence with sequence number "1", "received" in correspondence with sequence number "2", "received in correspondence with sequence number "3", "missing" in correspondence with sequence number "4", "missing" in correspondence with sequence number "5", "received" in correspondence with sequence number "6", and "received" in correspondence with sequence number "7".

The buffer amount correction unit 222 counts the number of packets output from the first reception buffer 203, specifies which of the sequence numbers the packet that is to be output next corresponds to, and specifies, from among the sequence numbers including and after the specified sequence number, the number of sequence numbers that are stored in correspondence with "missing".

The buffer amount correction unit 222 multiplies the specified number of sequence numbers by the number of packets included in the joined packet, and multiplies the result by the data size of the packet. The value resulting from this multiplication is the data amount of the packets that were lost on the transmission line (hereinafter, called the missing amount) and that were supposed to be stored in the first reception buffer 203.

The buffer amount correction unit 222 adds the added value received from the stored amount addition unit 207 and the missing amount, and outputs the resulting added value to the correction unit 208.

Instead of using the added value received from the stored amount addition unit 207, the correction unit 208 of embodiment 2 uses the added value received from the buffer amount correction unit 222 to control the counting speed in the reception timestamp timer 209 so that the added value received from the buffer amount correction unit 222 is a constant value.

If the added value increases, the counting speed of the reception timestamp timer 209 has become slower than the counting speed of the transmission timestamp timer 102. The correction unit 208 therefore outputs a control signal instructing the reception timestamp timer 209 to increase the counting speed. Upon receiving this control signal, the reception timestamp timer 209 increases the counting speed.

If the added value decreases, the counting speed of the reception timestamp timer 209 has become faster than the counting speed of the transmission timestamp timer 102. The correction unit 208 therefore outputs a control signal instructing the reception timestamp timer 209 to decrease the counting speed. Upon receiving this control signal, the reception timestamp timer 209 decreases the counting speed.

In the rate control processing of the present embodiment, the counting speed of the reception timestamp timer 209 is adjusted so as to obtain a constant value for the sum of the stored amount of packets in the first transmission buffer 105 (the first transmission buffer amount), the stored amount of packets in the first reception buffer 203 (the first reception buffer amount), and the missing amount of packets that were lost on the transmission line and were supposed to be stored in the first reception buffer 203.

Note that a description of the time-base recovery processing performed by reception device 200a has been omitted due to being substantially the same as the time-base recovery processing in embodiment 1.

Missing Packet Detection Unit

Figure 7:
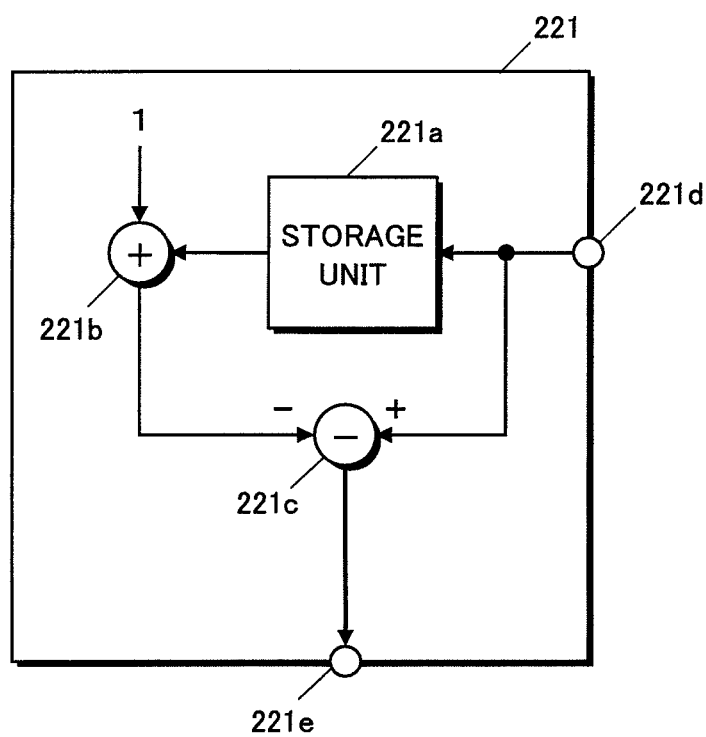
FIG. 7 shows the structure of a missing packet detection unit shown in FIG. 6.

The following describes the structure of the missing packet detection unit 221 included in the reception device 200 of FIG. 6, with reference to FIG. 7. FIG. 7 shows the structure of the missing packet detection unit shown in FIG. 6.

The missing packet detection unit 221 includes a storage unit 221a, an addition unit 221b, a subtraction unit 221c, an input terminal 221d, and an output terminal 221e.

The storage unit 221a initially stores a value of 0.

Upon receiving a sequence number from the input terminal 221d, the storage unit 221a stores the received sequence number, and outputs the sequence number stored immediately previously (the value "0" when a sequence number is input for the first time) to the addition unit 221b.

The addition unit 221b adds 1 to the value received from the storage unit 221a, and outputs the resulting added value to the subtraction unit 221c.

The subtraction unit 221c subtracts the received added value from the sequence number received from the input terminal 221d, and outputs the resulting subtracted value to the buffer amount correction unit 222 via the output terminal 221e. The subtracted value obtained by the subtraction unit 221c indicates the number of joined packets that are missing between the joined packet having attached thereto the sequence number currently received from the input terminal 221d and the joined packet having attached thereto the sequence number that was received immediately previously from the input terminal 221d.

The present embodiment as described above enables realizing synchronous transmission between a transmission device and a reception device when the input bit rate at which packets are input to the transmission device is a variable bit rate and the transmission bit rate on the transmission line is a constant bit rate, and even if a packet is lost on the transmission line.

Embodiment 3

The following describes a synchronous transmission system pertaining to embodiment 3 of the present invention that realizes synchronous transmission between a transmission device and a reception device, with reference to the drawings.

Embodiments 1 and 2 are directed at a case in which the bit rate at which packets are input to the transmission device is a variable bit rate, and the transmission bit rate on the transmission line is a constant bit rate. In contrast, the present embodiment and the later-described embodiment 4 are directed at case in which the input bit rate at which packets are input to the transmission device is a constant bit rate, and the transmission bit rate on the transmission line is a variable bit rate.

Note that the same reference characters have been given to constituent elements of the present embodiment that have substantially the same functions as in embodiment 1, and descriptions thereof have been omitted since the descriptions in embodiment 1 are applicable.

Synchronous Transmission System

The following describes the structure of the synchronous transmission system of the present embodiment with reference to FIG. 8. FIG. 8 shows the structure of the synchronous transmission system of the present embodiment.

A transmission device 100b and a reception device 200b transmit and receive packets via a transmission line 300b. The transmission line 300b is, for example, a wireless transmission line.

Stored Amount of Packets

Figure 9A:
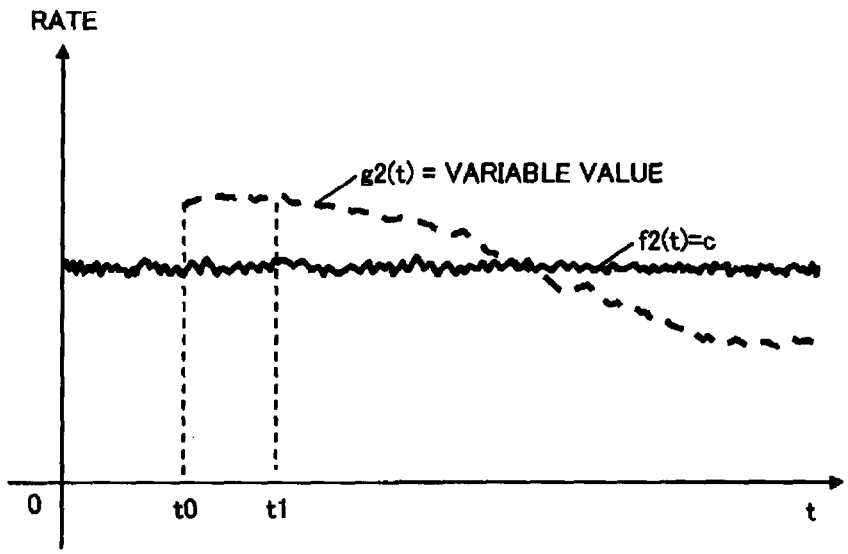
FIGS. 9A and 9B show changes in bit rate and stored amount of packets in a buffer over time in the synchronous transmission system of FIG. 8.
Figure 9B:
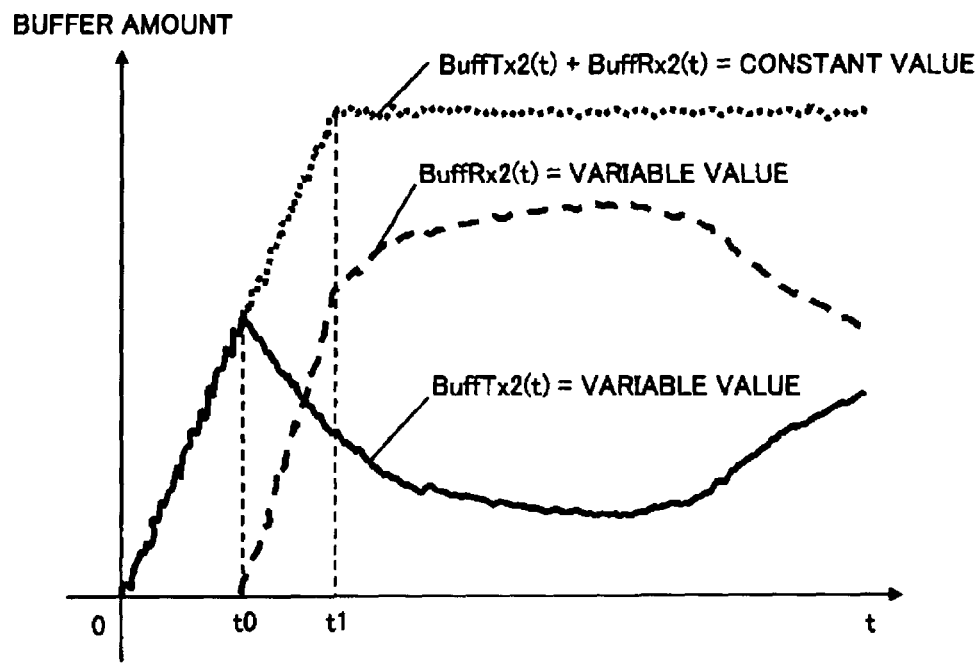

Prior to the description of the constituent elements shown in FIG. 8, the following describes the stored amount of packets in a second transmission buffer 105b and a second reception buffer 203b shown in FIG. 8, with reference to FIGS. 9A and 9B. FIGS. 9A and 9B show changes in bit rate and stored amount of packets over time in the synchronous transmission system of FIG. 8.

The input bit rate at which packets are input to the second transmission buffer 105b of the transmission device 100b is a constant bit rate, and is expressed by a rate function $f2(t)$. Also, the transmission bit rate on the transmission line is a variable bit rate, and is expressed by a rate function $g2(t)$.

In synchronous transmission, the output bit rate at which packets are output from the second reception buffer 203b is controlled so as to be equal to the input bit rate at which packets are input to the second transmission buffer 105b. For this reason, letting "delay" express a delay time from when a packet is input to the transmission device 100b until when a packet is output from the reception device 200b, the rate function $f2(t-\text{delay})$ expresses the output bit rate at which packets are output from the second reception buffer 203b.

Here, (1) packet writing to the second transmission buffer 105b is begun at time 0, (2) packet reading from the second transmission buffer 105b and packet writing to the second reception buffer 203b are begun at time t0, and (3) packet reading from the second reception buffer 203b is begun at time t1 (=delay).

In this case, the rate function $f2(t)$ is c (c being a constant value), and the function $g2(t)$ is 0 until time to, and a variable value at and after time t0 (FIG. 9A). Note that the function $f2(t-\text{delay})$ is 0 until time t1 (=delay), and c (c being a constant value) at and after time t1.

Letting $\text{BuffTx2}(t)$ be a stored amount function expressing the stored amount of packets in the second transmission buffer 105b at time t, the following expression (6) indicates the stored amount function $\text{BuffTx2}(t)$ at time t, which is at or after time t1 (FIG. 9B).

Expression (6)

$$\text{BuffTx2}(t) = \int_0^t f2(t)dt - \int_0^t g2(t)dt = \int_0^t cdt - \int_{t0}^t f2(t)dt \qquad (6)$$

Letting $\text{BuffRx2}(t)$ be a stored amount function expressing the stored amount of packets in the second reception buffer 203b at time t, the following expression (7) indicates the stored amount function $\text{BuffRx2}(t)$ at time t, which is at or after time t1 (FIG. 9B)

Expression (7)

$$\text{BuffRx2}(t) = \int_0^t g2(t)dt - \int_0^t f2(t-\text{delay})dt = \int_{t0}^t g2(t)dt - \int_{t0}^t cdt \qquad (7)$$

Based on expressions (6) and (7), the following expression (8) indicates a sum of the stored amount of packets in the second transmission buffer 105b at time t, which is at or after time t1, and the stored amount of packets in the second reception buffer 203b at time t.

Expression (8)

$$\begin{aligned}\text{BuffTx2}(t) + \text{BuffRx2}(t) &= \\ \int_0^t cdt - \int_{t0}^t g2(t)dt + \int_{t0}^t g2(t)dt - \int_{t0}^t cdt &= \\ \int_0^{t0} cdt &= \text{constant value}\end{aligned} \qquad (8)$$

As shown above, a constant value is obtained for the sum of the stored amount of packets in the second transmission buffer 105b at time t, which is at or after time t1, and the stored amount of packets in the second reception buffer 203b at time t (FIG. 9B).

In other words, a constant value is obtained for the sum of the stored amount of packets in the second transmission buffer 105b just after a certain packet has been read from the second transmission buffer 105b and the stored amount of packets in the second reception buffer 203b just after the certain packet has been written to the second reception buffer 203b. Also, a constant value is obtained for the sum of the stored amount of packets in the second transmission buffer 105b just before a certain packet is read from the second transmission buffer 105b and the stored amount of packets in the second reception buffer 203b just before the certain packet is written to the second reception buffer 203b.

In the present embodiment, synchronous transmission between the transmission device 100b and reception device 200b is realized by utilizing the relationship in which the sum of the stored packet amounts is constant.

The present embodiment makes use of the sum of the stored amount of packets in the second transmission buffer 105b just after a certain packet has been read from the second transmission buffer 105b and the stored amount of packets in the second reception buffer 203b just after the certain packet has been written to the second reception buffer 203b.

Note that the sum of the stored amount of packets in the second transmission buffer 105b just before a certain packet is read from the second transmission buffer 105b and the stored amount of packets in the second reception buffer 203b just before the certain packet is written to the second reception buffer 203b may be used.

Although it is desirable to use either of the above sums to realize synchronous transmission, when a sufficient amount of packets is stored in the second transmission buffer 105b and the second reception buffer 203b, there may be a slight difference in the timing at which the stored amounts of the second transmission buffer 105b and the second reception buffer 203b are acquired.

Transmission Device

The transmission device 100b includes the input terminal 101, the transmission timestamp timer 102, the timestamp attachment unit 103, the second transmission buffer 105b, a second transmission buffer amount read unit 106b, a second transmission buffer amount attachment unit 104b, and the transmission processing unit 107.

The second transmission buffer 105b is constituted from a FIFO buffer. The second transmission buffer 105b temporarily stores input packets, and outputs the stored packets at a variable bit rate. Note that the second transmission buffer 105b joins a plurality of packets together and outputs the group of packets (the joined packet) in order to increase transmission efficiency.

The second transmission buffer amount read unit 106b reads the stored amount of packets in the second transmission buffer 105b (hereinafter, called the "second transmission buffer amount"), and outputs the second transmission buffer amount to the second transmission buffer amount attachment unit 104b. Here, the second transmission buffer amount is the stored amount of packets in the second transmission buffer 105b just after the reading, from the second transmission buffer 105b, of the packet to which the second transmission buffer amount is to be attached by the second transmission buffer amount attachment unit 104b.

In order to facilitate processing in the reception device 200, the second transmission buffer amount is the stored amount of data in the second transmission buffer 105b excluding the data amount of the timestamp.

The second transmission buffer amount can be calculated in, for example, the following way. The data size of the timestamp is assumed to be a fixed data size. The data size of the timestamp is multiplied by the number of packets stored in the second transmission buffer 105b (a value equaling the number of input packets minus the number of output packets). The value resulting from the multiplication is subtracted from the actual stored amount of the second transmission buffer 105b. The value resulting from the subtraction is the second transmission buffer amount.

The second transmission buffer amount attachment unit 104b attaches the second transmission buffer amount, which is input from the second transmission buffer amount read unit 106b, to the beginning of the joined packet received from the second transmission buffer 105b.

Figure 10:
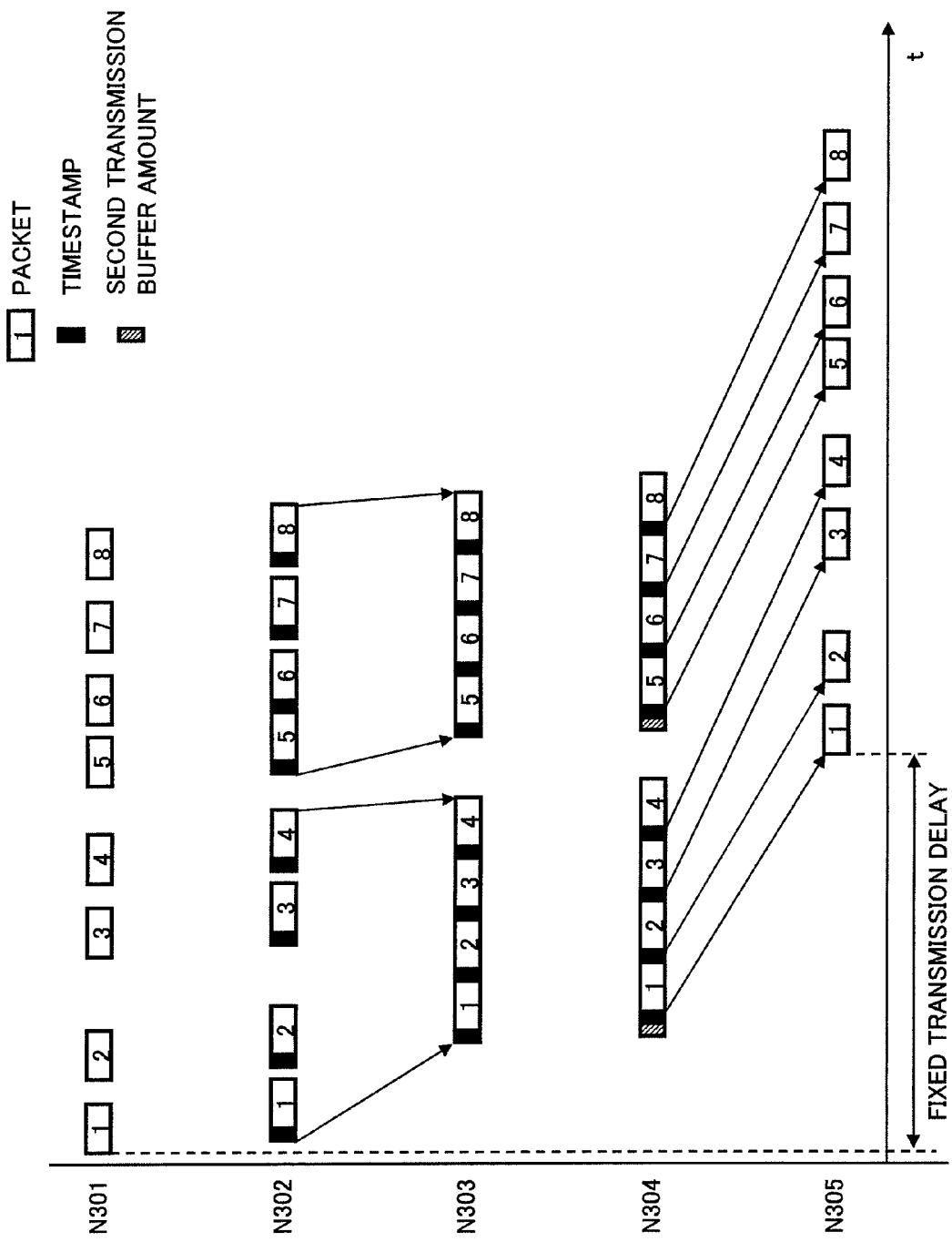
FIG. 10 show changes in packet structure over time in the synchronous transmission system of FIG. 8.

In the transmission device 100b, when a packet is input to the input terminal 101 (N301 of FIG. 10), the timestamp attachment unit 103 attaches a count value supplied from the transmission timestamp timer 102 to the beginning of the input packet as a timestamp (N302). The packet having the timestamp attached thereto is stored in the second transmission buffer 105b.

The second transmission buffer 105b outputs the joined packet (N303). The second transmission buffer amount attachment unit 104b attaches a second transmission buffer amount read by the second transmission buffer amount read unit 106b to the beginning of the joined packet (N304). The transmission processing unit 107 performs predetermined processing on the joined packet having the second transmission buffer amount attached thereto, and the resulting packet is sent to the transmission line 300b.

Reception Device

The reception device 200b performs time-base recovery processing, rate control processing and the like, which are conditions of synchronous transmission. The reception device 200b includes the reception processing unit 201, a separation unit 202b, the second reception buffer 203b, the timestamp buffer 204, a second reception buffer amount read unit 206b, a stored amount addition unit 207b, a correction unit 208b, the reception timestamp timer 209, the comparison unit 210, the packet read unit 211, and the output terminal 212.

The separation unit 202b receives, from the reception processing unit 201, a joined packet having a second transmission buffer amount attached thereto, and separates the received joined packet into a second transmission buffer amount, a plurality of timestamps, and a plurality of packets. The separation unit 202b outputs the second transmission buffer amount, timestamps, and packets to the stored amount addition unit 207b, timestamp buffer 204, and second reception buffer 203b respectively.

The second reception buffer 203b is constituted from a FIFO buffer, and temporarily stores input packets. Packets output from the second reception buffer 203b are externally sent via the output terminal 212 (N305 of FIG. 10).

The second reception buffer amount read unit 206b reads the stored amount of packets in the second reception buffer 203b (hereinafter, called the "second reception buffer amount"), and outputs the read second reception buffer amount to the stored amount addition unit 207b. The second reception buffer amount is the stored amount of packets in the second reception buffer 203b just after the writing to the second reception buffer 203b of the packets constituting the joined packet having attached thereto the second transmission buffer amount that was output to the stored amount addition unit 207b.

The stored amount addition unit 207b adds the second transmission buffer amount that was received from the separation unit 202b and the second reception buffer amount that was received from the second reception buffer amount read unit 206b.

Note that just after the packets included in the joined packet input from the separation unit 202b have been written to the second reception buffer 203b, the second transmission buffer amount that is input to the stored amount addition unit 207b by the separation unit 202b is the second transmission buffer amount that was attached to the joined packet whose packets were just previously written to the second reception buffer 203b.

The correction unit 208b controls the counting speed of the reception timestamp timer 209 so that the added value received as input from the stored amount addition unit 207b is constant.

If the added value increases, the counting speed of the reception timestamp timer 209 has become slower than the counting speed of the transmission timestamp timer 102. The correction unit 208b therefore outputs a control signal instructing the reception timestamp timer 209 to increase the counting speed.

If the added value decreases, the counting speed of the reception timestamp timer 209 has become faster than the counting speed of the transmission timestamp timer 102. The correction unit 208b therefore outputs a control signal instructing the reception timestamp timer 209 to decrease the counting speed.

Note that a description of the time-base recovery processing performed by reception device 200b has been omitted due to being substantially the same as the time-base recovery processing in embodiment 1.

Rate Control Processing

The second reception buffer amount read unit 206b reads the second reception buffer amount of the second reception buffer 203b, and outputs the read second reception buffer amount to the stored amount addition unit 207b. The stored amount addition unit 207b receives an input of the second transmission buffer amount from the separation unit 202b.

The stored amount addition unit 207b adds the second transmission buffer amount received from the separation unit 202b and the second reception buffer amount received from the second reception buffer amount read unit 206.

If the result of the addition increases, the correction unit 208b outputs a control signal for instructing the reception timestamp timer 209 to increase the counting speed. Upon receiving this control signal, the reception timestamp timer 209 increases the counting speed.

If the result of the addition decreases, the correction unit 208b outputs a control signal for instructing the reception timestamp timer 209 to decrease the counting speed. Upon receiving this control signal, the reception timestamp timer 209 decreases the counting speed.

The present embodiment as described above enables realizing synchronous transmission between a transmission device and a reception device even if the input bit rate at which packets are input to the transmission device is a constant bit rate and the transmission bit rate on the transmission line is a variable bit rate.

Supplementary Remarks (1) In the third embodiment and the hereinafter-described embodiment, the stored amounts of packets to which timestamps have not been attached are used as the stored amount of packets in the second transmission buffer 105b and stored amount of packets in the second reception buffer 203b used in the correction of the counting speed in the reception timestamp timer 209. However, the present invention is not limited to this. The stored amounts of packets may include the timestamps.

Embodiment 4

The following describes a synchronous transmission system pertaining to embodiment 4 of the present invention that realizes synchronous transmission between a transmission device and a reception device, with reference to the drawings.

The present embodiment is the same as embodiment 3, with the addition of a function for realizing synchronous transmission between transmission and reception devices even if a packet is lost on the transmission line.

Note that the same reference characters have been given to constituent elements of embodiment 4 that are substantially the same as embodiments 1 to 3, and descriptions thereof have been omitted since the descriptions in embodiments 1 to 3 are applicable.

Synchronous Transmission System

Figure 11:
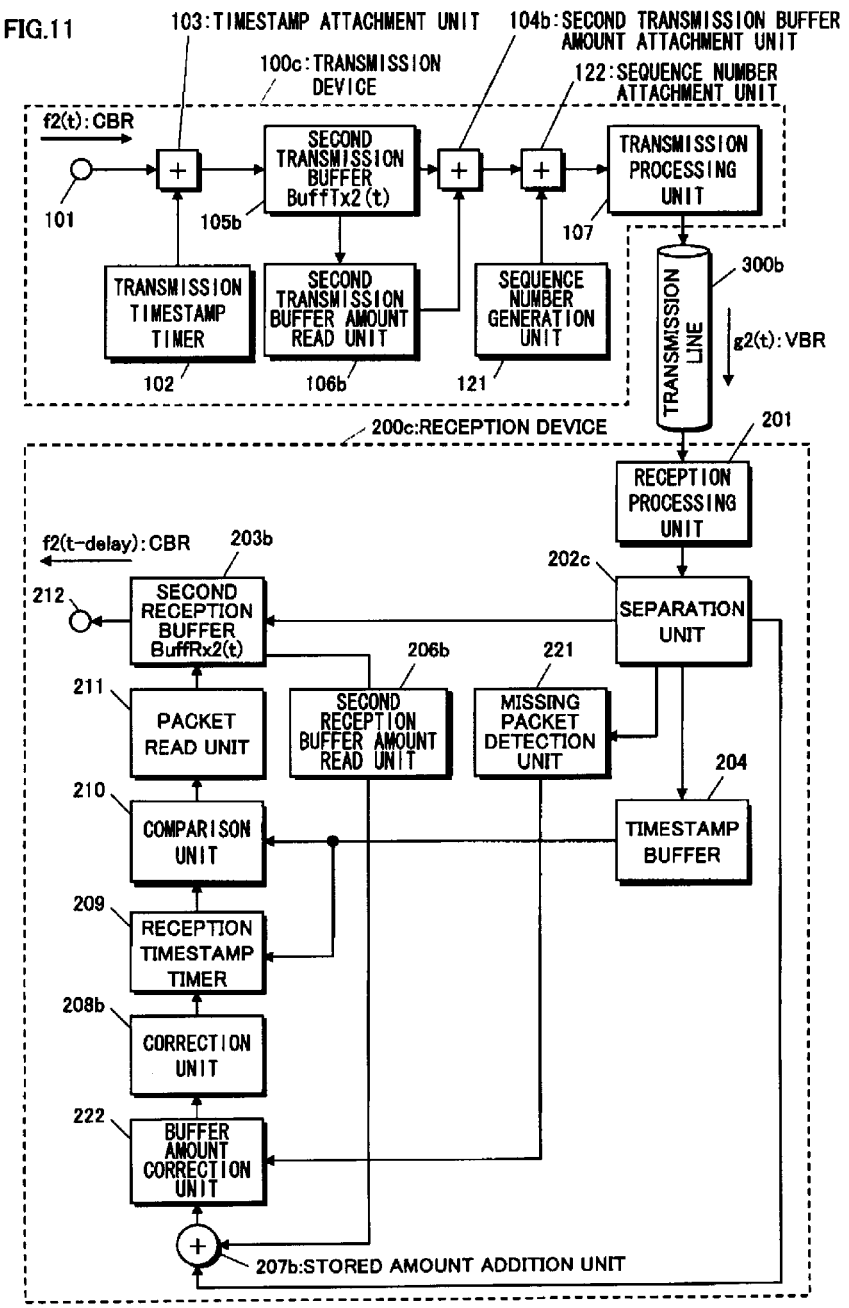
FIG. 11 shows the structure of a synchronous transmission system of embodiment 4.

The following describes the structure of the synchronous transmission system of the present embodiment with reference to FIG. 11. FIG. 11 shows the structure of the synchronous transmission system of the present embodiment.

A transmission device 100c and a reception device 200c transmit and receive packets via the transmission line 300b. Note that packets input to the transmission device 100c have a fixed length.

Transmission Device

The transmission device 100c has the same structure as the transmission device 100b of embodiment 3, with the addition of a sequence number generation unit 121 and a sequence number attachment unit 122.

In the transmission device 100c, when a packet is input to the input terminal 101, the timestamp attachment unit 103 attaches the count value supplied from the transmission timestamp timer 102 to the beginning of the input packet as a timestamp. The packet having the timestamp attached thereto is stored in the second transmission buffer 105b.

The second transmission buffer 105b outputs a joined packet composed of a fixed number of packets that have been joined together. The second transmission buffer amount attachment unit 104b attaches the second transmission buffer amount read by the second transmission buffer amount read unit 106b to the beginning of the joined packet, and the sequence number attachment unit 122 attaches the sequence number supplied from the sequence number generation unit 121 to the beginning of the joined packet having the second transmission buffer amount attached thereto. The transmission processing unit 107 performs predetermined processing on the joined packet having the sequence number and second transmission buffer amount attached thereto, and outputs the resulting packet to the transmission line 300b.

Reception Device

The reception device 200c has the same structure as the reception device 200b of embodiment 3, with the addition of a missing packet detection unit 221 and a buffer amount correction unit 222, and a separation unit 202c instead of the separation unit 202b.

The separation unit 202c receives the joined packet having the sequence number and second transmission buffer amount attached thereto from the reception processing unit 201, and separates the received joined packet into the sequence number, the second transmission buffer amount, a plurality of timestamps, and a plurality of packets. The separation unit 202c outputs the sequence number, second transmission buffer amount, timestamps, and packets to the missing packet detection unit 221, the stored amount addition unit 207b, the timestamp buffer 204, and the second reception buffer 203b respectively.

The reception device 200c performs rate control processing as follows.

Just after the packets included in the joined packet input from the separation unit 202c have been written to the second reception buffer 203b, the second reception buffer amount read unit 206b reads the second reception buffer amount of the second reception buffer 203b, and outputs the read second reception buffer amount to the stored amount addition unit 207b.

Also, in the same way as described in embodiment 2, the missing packet detection unit 221 detects, based on the sequence number received from the separation unit 202c, the number of packets that were lost on the transmission line, and outputs the detected number of missing packets to the buffer amount correction unit 222.

The stored amount addition unit 207b adds the second transmission buffer amount received from the separation unit 202c and the second reception buffer amount received from the second reception buffer amount read unit 206b.

In the same way as described in embodiment 2, the buffer amount correction unit 222 calculates the data amount of packets included in a joined packet that was lost on the transmission line (missing packet amount) and that were supposed to be stored in the second reception buffer 203b. The buffer amount correction unit 222 then adds the calculated missing packet amount to the added value received from the stored amount addition unit 207b.

Based on the added value received from the buffer amount correction unit 222, the correction unit 208b controls the counting speed of the reception timestamp timer 209 so that the added value received from the buffer amount correction unit 222 is constant.

If the added value increases, the counting speed of the reception timestamp timer 209 has become slower than the counting speed of the transmission timestamp timer 102. The correction unit 208b therefore outputs a control signal instructing the reception timestamp timer 209 to increase the counting speed. Upon receiving this control signal, the reception timestamp timer 209 increases the counting speed.

If the added value decreases, the counting speed of the reception timestamp timer 209 has become faster than the counting speed of the transmission timestamp timer 102. The correction unit 208b therefore outputs a control signal instructing the reception timestamp timer 209 to decrease the counting speed. Upon receiving this control signal, the reception timestamp timer 209 decreases the counting speed.

Note that a description of the time-base recovery processing performed by reception device 200c has been omitted due to being substantially the same as the time-base recovery processing in embodiment 1.

The present embodiment as described above enables realizing synchronous transmission between a transmission device and a reception device when the input bit rate at which packets are input to the transmission device is a constant bit rate and the transmission bit rate on the transmission line is a variable bit rate, and even if a packet is lost on the transmission line.

Embodiment 5

The following describes a synchronous transmission system pertaining to embodiment 5 of the present invention that realizes synchronous transmission between a transmission device and a reception device, with reference to the drawings.

Embodiments 1 and 2 are directed at a case in which the bit rate at which packets are input to the transmission device is a variable bit rate, and the transmission bit rate on the transmission line is a constant bit rate. Embodiments 3 and 4 are directed at case in which the bit rate at which packets are input to the transmission device is a constant bit rate, and the transmission bit rate on the transmission line is a variable bit rate. In contrast, the present embodiment and the later-described embodiments 6 and 7 are directed at a case in which the bit rate at which packets are input to the transmission device is a variable bit rate, and the transmission bit rate on the transmission line is a variable bit rate.

Note that the same reference characters have been given to constituent elements of the present embodiment that have substantially the same functions as in embodiments 1 to 4, and descriptions thereof have been omitted since the descriptions in embodiments 1 to 4 are applicable.

Synchronous Transmission System

Figure 12:
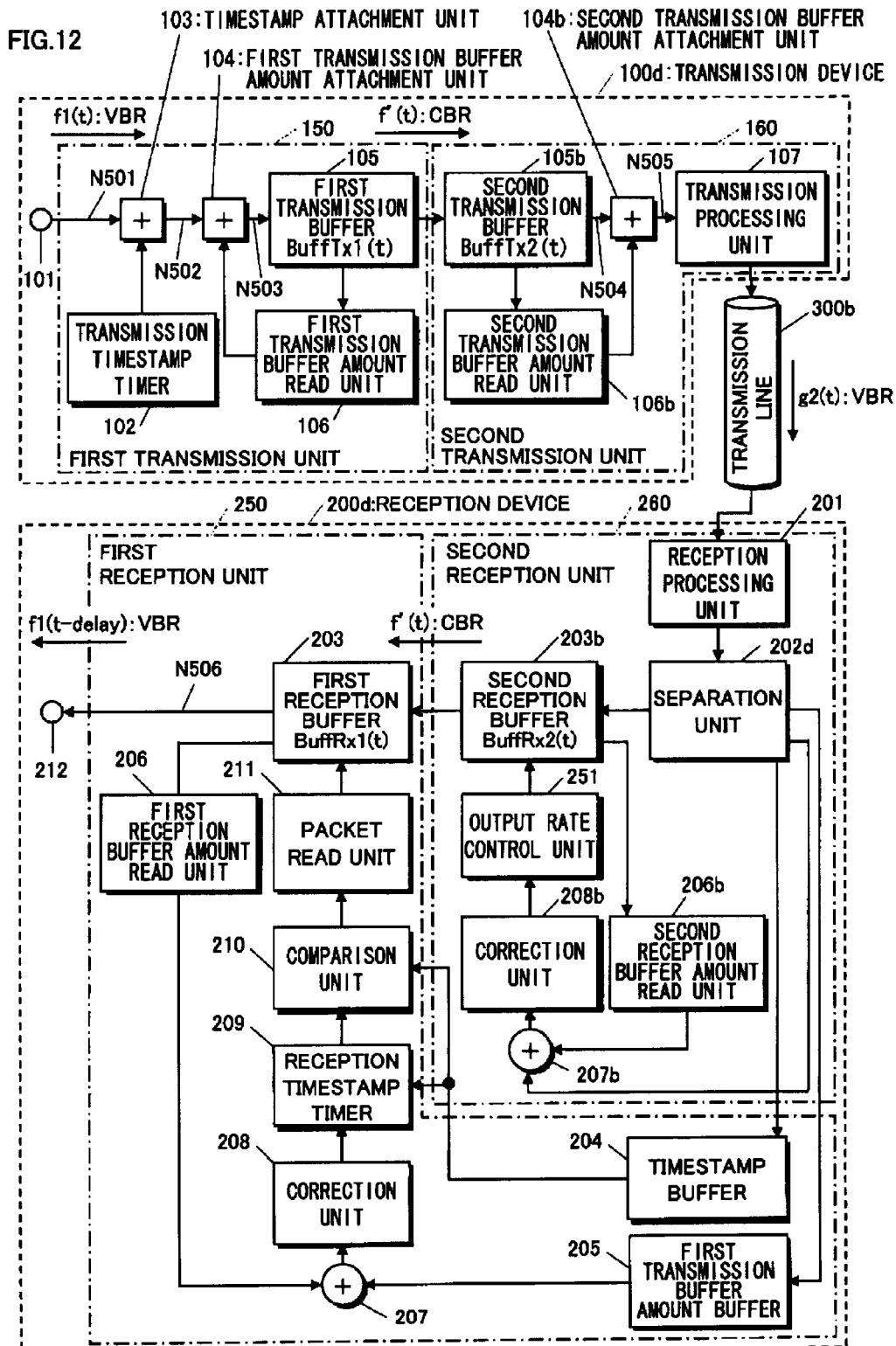
FIG. 12 shows the structure of a synchronous transmission system of embodiment 5.

The following describes the structure of the synchronous transmission system of the present embodiment with reference to FIG. 12. FIG. 12 shows the structure of the synchronous transmission system of the present embodiment.

A transmission device 100d and a reception device 200d transmit and receive packets via the transmission line 300b.

Transmission Device

The transmission device 100d includes the input terminal 101, a first transmission unit 150, and a second transmission unit 160.

The first transmission unit 150 has the same structure as the transmission device 100 of embodiment 1, with the exception of lacking the input terminal 101 and the transmission processing unit 107. The first transmission unit 150 outputs packets that were received at a variable input rate, to the second transmission unit 160 at a constant bit rate. Control for outputting packets from the first transmission buffer 105 at a constant bit rate is realized by, in the exemplary case of an MPEG2 TS, extracting the stream rate from the stream header, and outputting the packets at a stream rate obtained by adding the extracted stream rate and the rate corresponding to the timestamps attached to the input packets and the rate corresponding to the overhead data of the first transmission buffer amount.

The second transmission unit 160 has the same structure as the transmission device 100b of embodiment 3, with the exception of lacking the input terminal 101, the transmission timestamp timer 102, and the timestamp attachment unit 103. The second transmission unit 160 outputs packets received from the first transmission unit 150 at a constant bit rate, to the transmission line 300b at a variable bit rate.

Figure 13:
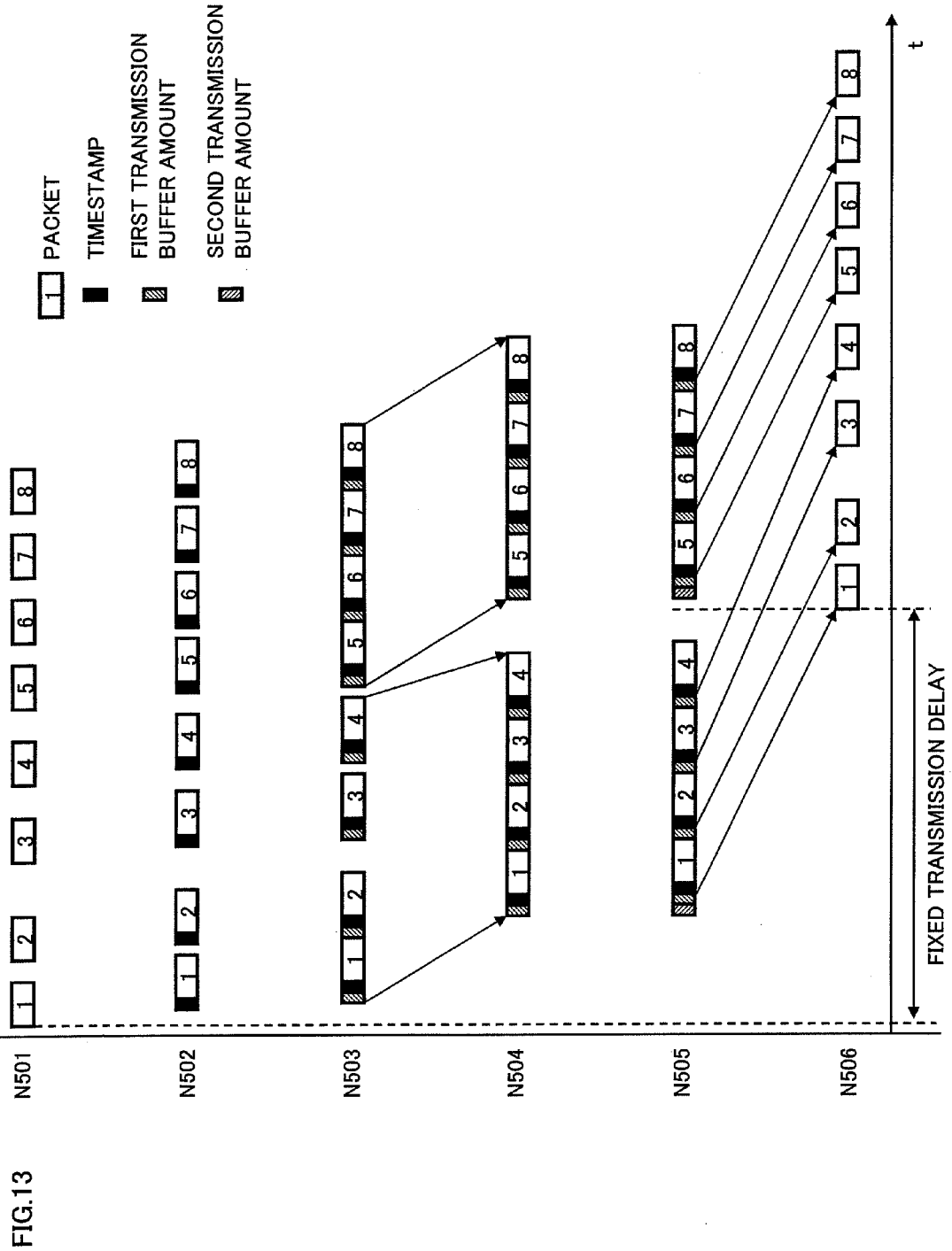
FIG. 13 shows changes in packet structure over time in the synchronous transmission system of FIG. 12.

In the transmission device 100d, when a packet is input to the input terminal 101 (N501 in FIG. 13), the timestamp attachment unit 103 attaches the count value supplied from the transmission timestamp timer 102 to the beginning of the input packet as a timestamp (N502), and furthermore, the first transmission buffer amount attachment unit 104 attaches the first transmission buffer amount read by the first transmission buffer amount read unit 106 to the beginning of the packet having the timestamp attached thereto (N503). The packet having the timestamp and first transmission buffer amount attached thereto is stored in the first transmission buffer 105.

The packet that is stored in the first transmission buffer 105 is output at a constant bit rate, and stored in a second transmission buffer 105b.

The second transmission buffer 105b outputs a joined packet composed of a fixed number of packets that have been joined together (N504). The second transmission buffer amount attachment unit 104b attaches a second transmission buffer amount read by the second transmission buffer amount read unit 106b to the beginning of the joined packet (N505). The transmission processing unit 107 performs predetermined processing on the joined packet having the second transmission buffer amount attached thereto, and the resulting packet is sent to the transmission line 300b.

Reception Device

The reception device 200d includes a second reception unit 260, a first reception unit 250, and the output terminal 212.

The second reception unit 260 performs substantially the same rate control processing as the rate control processing performed by the reception device 200b. However, the second reception unit 260 does not perform the time-base recovery processing performed by the reception device 200b. This is because it is sufficient for time-base recovery to be performed when packets are output from the reception device 200d, and it is sufficient for the second reception unit 260 to output packets to the first reception unit 250 at a constant bit rate that is equal to the constant bit rate at which packets are output from the first transmission unit 150 to the second transmission unit 160.

The second reception unit 260 includes the reception processing unit 201, a separation unit 202d, the second transmission buffer 203b, the second reception buffer amount read unit 206b, the stored amount addition unit 207b, the correction unit 208b, and a read rate control unit 251.

The separation unit 202d receives, from the reception processing unit 201, a joined packet having a second transmission buffer amount attached thereto, and separates the received joined packet into a plurality of first transmission buffer amounts, a second transmission buffer amount, a plurality of timestamps, and a plurality of packets. The separation unit 202b outputs the first transmission buffer amounts, the second transmission buffer amount, timestamps, and packets to the first transmission buffer amount buffer 205, the stored amount addition unit 207b, timestamp buffer 204, and second reception buffer 203b respectively.

Instead of controlling the oscillation frequency of the variable frequency oscillator 209a of the reception timestamp timer 209, the correction unit 208b of the present embodiment performs later-described control of the oscillation frequency by a later-described variable frequency oscillator 251a included in the read rate control unit 251.

The read rate control unit 251 controls the output bit rate at which packets are output from the second reception buffer 203b.

The second reception unit 260 performs rate control processing as follows.

The stored amount of packets in the second transmission buffer 105b just after the joined packet has been read from the second transmission buffer 105b (the second transmission buffer amount received from the separation unit 202d) is added to the stored amount of packets in the second reception buffer 203b just after the plurality of packets included in the joined packet have been written to the second reception buffer 203b (the second reception buffer amount that is read by and received from the second reception buffer amount read unit 206b) to obtain an added value, and the correction unit 208b controls the read rate control unit 251 so that the added value is a constant value.

If the added value increases, the bit rate at which packets are output from the second reception buffer 203b has become lower than the bit rate at which packets are output from the second transmission buffer 105b. The correction unit 208b therefore outputs a control signal instructing the read rate control unit 251 to increase the output bit rate.

If the added value decreases, the bit rate at which packets are output from the second reception buffer 203b has become higher than the bit rate at which packets are output from the second transmission buffer 105b. The correction unit 208b therefore outputs a control signal instructing the read rate control unit 251 to decrease the output bit rate.

Based on the control signal received from the correction unit 208b, the read rate control unit 251 controls the bit rate at which packets are output from the second reception buffer 203b.

Read Rate Control Unit

Figure 14:
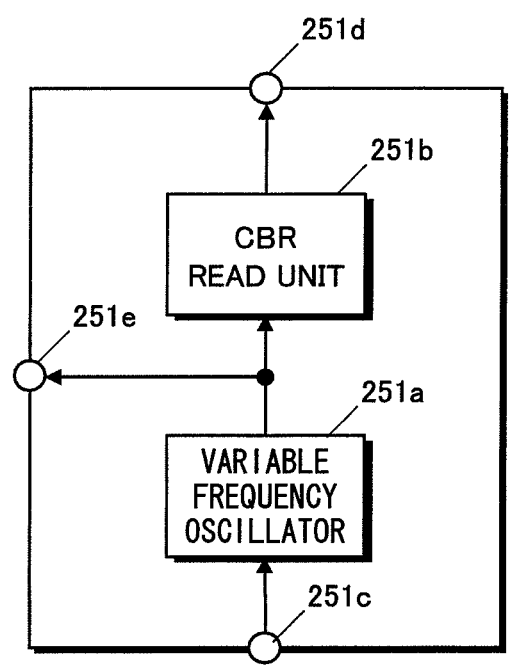
FIG. 14 shows the structure of an output rate control unit shown in FIG. 12.

The following describes the structure of the read rate control unit 251 included in the reception device 200d of FIG. 12, with reference to FIG. 14. FIG. 14 shows the structure of the read rate control unit 251 shown in FIG. 12.

The read rate control unit 251 includes the variable frequency oscillator 251a, a CBR read unit 251b, a control signal input terminal 251c, a read signal output terminal 251d, and a clock output terminal 251e.

The variable frequency oscillator 251a can oscillate at frequencies within a predetermined range. The variable frequency oscillator 251a supplies a clock signal at the oscillated frequency to the counter 209b, as well as outputs the clock signal to the clock output terminal 251e.

The variable frequency oscillator 251a increases the oscillation frequency upon receiving, from the control terminal 209c, a control signal that is an instruction to increase the bit rate at which packets are read from the second reception buffer 203b, and decreases the oscillation frequency upon receiving a control signal that is an instruction to decrease the bit rate at which packets are read from the second reception buffer 203b.

The CBR read unit 251b includes a counter that counts the clock signal received from the variable frequency oscillator 251a, and generates a read signal upon counting a certain number of clock signals. The CBR read unit 251b outputs the generated read signal to the second reception buffer 203b via the read signal output terminal 251d. Upon receiving the read signal, the second reception buffer 203b outputs one stored packet to the first reception buffer 203.

Returning to the description of FIG. 12, the first reception unit 250 has the same structure as the reception device 200 of embodiment 1, with the exception of lacking the reception processing unit 201, the separation unit 202, and the output terminal 212. The first reception unit 250 performs substantially the same time-base recovery processing and rate control processing as the reception device 200 of embodiment 1.

The first reception unit 250 performs rate control processing as follows.

The stored amount of packets in the first transmission buffer 105 just before a certain packet is written to the first transmission buffer 105 (the first transmission buffer amount that was retrieved from the first transmission buffer amount buffer 205) is added to the stored amount of packets in the first reception buffer 203 just before the certain packet is read from the first reception buffer (the first reception buffer amount that is read by and received from the first reception buffer amount read unit 206) to obtain an added value, and the correction unit 208 controls the oscillation frequency of the variable frequency oscillator 209a in the reception timestamp timer 209 so that the added value is a constant value.

If the added value increases, the correction unit 208 controls the variable frequency oscillator 209a to increase the oscillation frequency, and if the added value decreases, the correction unit 208 controls the variable frequency oscillator 209a to decrease the oscillation frequency.

The first reception unit 250 performs time-base recovery processing as follows.

The variable frequency oscillator 209a in the reception timestamp timer 209 oscillates at a frequency according to the control of the correction unit 208, and the counter 209b counts the clock signal generated by the variable frequency oscillator 209a.

The comparison unit 210 compares the count value indicated by the timestamp retrieved from the timestamp buffer 204 and the count value received from the counter 209b, and if both count values match, the comparison unit 210 outputs the packet read signal to the packet read unit 211. Upon receiving the packet read signal from the comparison unit 210, the packet read unit 211 causes the first reception buffer 203 to output one packet. Accordingly, one packet is externally output from the first reception buffer 203 via the output terminal 212.

The present embodiment as described above enables realizing synchronous transmission between a transmission device and a reception device even if the input bit rate at which packets are input to the transmission device is a variable bit rate and the transmission bit rate on the transmission line is a variable bit rate.

Embodiment 6

The following describes a synchronous transmission system pertaining to embodiment 6 of the present invention that realizes synchronous transmission between a transmission device and a reception device, with reference to the drawings.

Embodiment 6 describes a simplified structure of the transmission device 100d and reception device 200d of embodiment 5, and enables synchronous transmission even if both the input bit rate and transmission bit rate of packets are variable bit rates.

Note that the same reference characters have been given to constituent elements of the present embodiment that have substantially the same functions as in embodiments 1 to 5, and descriptions thereof have been omitted since the descriptions in embodiments 1 to 5 are applicable.

Synchronous Transmission System

Figure 15:
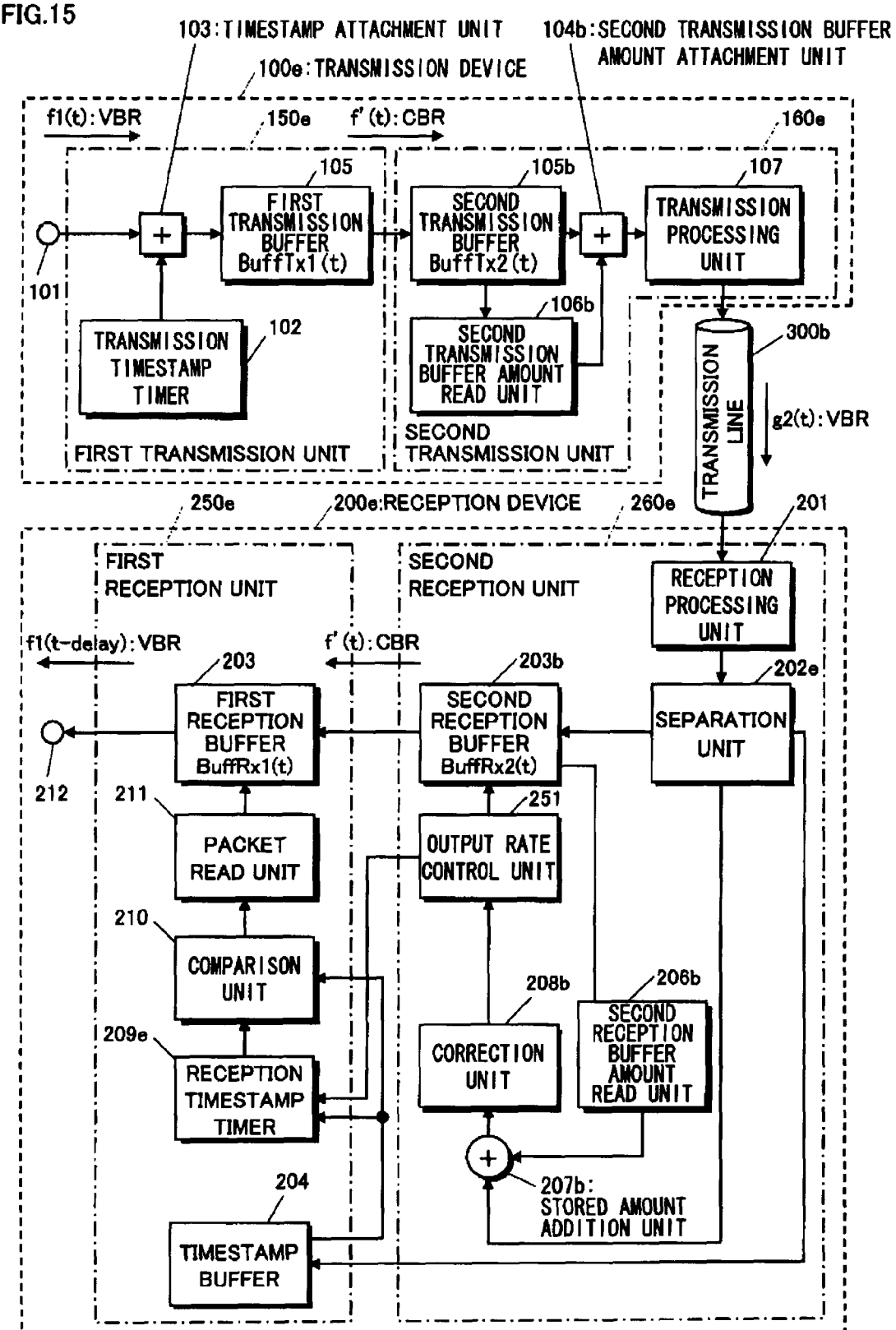
FIG. 15 shows the structure of a synchronous transmission system of embodiment 6.

The following describes the structure of the synchronous transmission system of the present embodiment with reference to FIG. 15. FIG. 15 shows the structure of the synchronous transmission system of the present embodiment.

A transmission device 100e and a reception device 200e transmit and receive packets via the transmission line 300b.

Transmission Device

The transmission device 100e includes the input terminal 101, a first transmission unit 150e, and a second transmission unit 160e that has the same structure as the second transmission unit 160 of embodiment 5.

The first transmission unit 150e includes the transmission timestamp timer 102, the timestamp attachment unit 103, and the first transmission buffer 105 that temporarily stores packets input at a variable bit rate and outputs the stored packets at a constant bit rate. Control for outputting packets from the first transmission buffer 105 at a constant bit rate is realized by, in the exemplary case of an MPEG2 TS, extracting the stream rate from the stream header, and outputting the packets at a stream rate obtained by adding the extracted stream rate and the rate corresponding to the timestamps attached to the input packets and the rate corresponding to the overhead data of the first transmission buffer amount.

In the transmission device 100e, when a packet is input to the input terminal 101, the timestamp attachment unit 103 attaches a count value supplied from the transmission timestamp timer 102 to the beginning of the input packet as a timestamp. The packet having the timestamp attached thereto is stored in the first transmission buffer 105.

The packet stored in the first transmission buffer 105 is output to the second transmission buffer 105b at a constant bit rate, and stored in the second transmission buffer 105b.

The second transmission buffer 105b outputs a joined packet composed of a plurality of packets that have been joined together. The second transmission buffer amount attachment unit 104b attaches the second transmission buffer amount read by the second transmission buffer amount read unit 106b to the beginning of the joined packet. The transmission processing unit 107 performs predetermined processing on the joined packet having the second transmission buffer amount attached thereto, and outputs the resulting packet to the transmission line 300b.

Reception Device

The reception device 200e includes a second reception unit 260e, a first reception unit 250e, and an input terminal 221.

Similarly to the second reception unit 260 of embodiment 5, the second reception unit 260e performs substantially the same rate control processing as the rate control processing performed by the reception device 200b, but does not perform the time-base recovery processing performed by the reception device 200b.

The second reception unit 260e has the same structure as the second reception unit 260 of embodiment 5, with the exception of a separation unit 202e instead of the separation unit 202d.

The separation unit 202e receives a joined packet from the reception processing unit 201, and separates the received joined packet into the second transmission buffer amount, a plurality of timestamps, and a plurality of packets. The separation unit 202b outputs the second transmission buffer amount, timestamps, and packets to the stored amount addition unit 207b, timestamp buffer 204, and second reception buffer 203b respectively.

Note that a description of the rate control processing performed by the second reception unit 260e has been omitted due to being substantially the same as the rate control processing performed by the second reception unit 260 of embodiment 5.

It should be noted that in embodiment 6, the clock signal whose frequency is controlled by the correction unit 208b is output from the read rate control unit 251 to the reception timestamp timer 209e via the clock output terminal 251e.

The first reception unit 250e performs substantially the same time-base recovery processing as the time-base recovery processing performed by the reception device 200. However, the first reception unit 250e does not perform the rate control processing performed by the reception device 200b.

The first reception unit 250e does not perform rate control processing for the following reason.

The second reception unit 260e performs rate control processing. The frequency of the clock signal output by the read rate control unit 251 of the second reception unit 260 is therefore adjusted to the same frequency as the clock signal generated by the oscillator 102a of the transmission timestamp timer 102. Using the clock signal output by the read rate control unit 251 therefore eliminates the need to generate a clock signal whose frequency has been adjusted to be the same as the clock signal generated by the oscillator 102a of the transmission timestamp timer 102.

The first reception unit 250e includes a reception timestamp timer 209e, the comparison unit 210, the packet read unit 211, and the first reception buffer 203.

The reception timestamp timer 209e includes a counter that counts the clock signal received from the read rate control unit 251, and outputs a count value to the comparison unit 210. The counter included in the reception timestamp timer 209e is preset in the same procedure as the counter 209b of the reception timestamp timer 209. Note that the reception timestamp timer 209e does not include a variable frequency oscillator like the reception timestamp timer 209.

The first reception unit 250e performs time-base recovery as follows.

The preset reception timestamp timer 209e counts the clock signal received from the read rate control unit 251, and outputs the count value to the comparison unit 210. The comparison unit 210 compares the count value indicated by the timestamp retrieved from the timestamp buffer 204 and the count value received from the reception timestamp timer 209e, and if both count values match, the comparison unit 210 outputs the packet read signal to the packet read unit 211. Upon receiving the packet read signal from the comparison unit 210, the packet read unit 211 causes the first reception buffer 203 to output one packet.

The present embodiment as described above enables realizing synchronous transmission between a transmission device and a reception device that have a simpler structure than embodiment 5, even if the input bit rate at which packets are input to the transmission device is a variable bit rate and the transmission bit rate on the transmission line is a variable bit rate.

Supplementary Remarks (1) In embodiment 6, the following may be performed if the frequency of the oscillator 102a in the transmission timestamp timer 102 is different from the frequency of the variable frequency oscillator 251a in the read rate control unit 251. A PLL circuit or the like may be used to multiply or divide the frequency of the variable frequency oscillator 251a, and a clock signal having the multiplied or divided frequency may be supplied to the reception timestamp timer 209e.

Embodiment 7

The following describes a synchronous transmission system pertaining to embodiment 7 of the present invention that realizes synchronous transmission between a transmission device and a reception device, with reference to the drawings.

Embodiment 7 describes a simplified structure of the transmission device 100d and reception device 200d of embodiment 5, and enables synchronous transmission even if both the input bit rate and transmission bit rate of packets are variable bit rates.

Note that the same reference characters have been given to constituent elements of the present embodiment that have substantially the same functions as in embodiments 1 to 6, and descriptions thereof have been omitted since the descriptions in embodiments 1 to 6 are applicable.

Synchronous Transmission System

Figure 16:
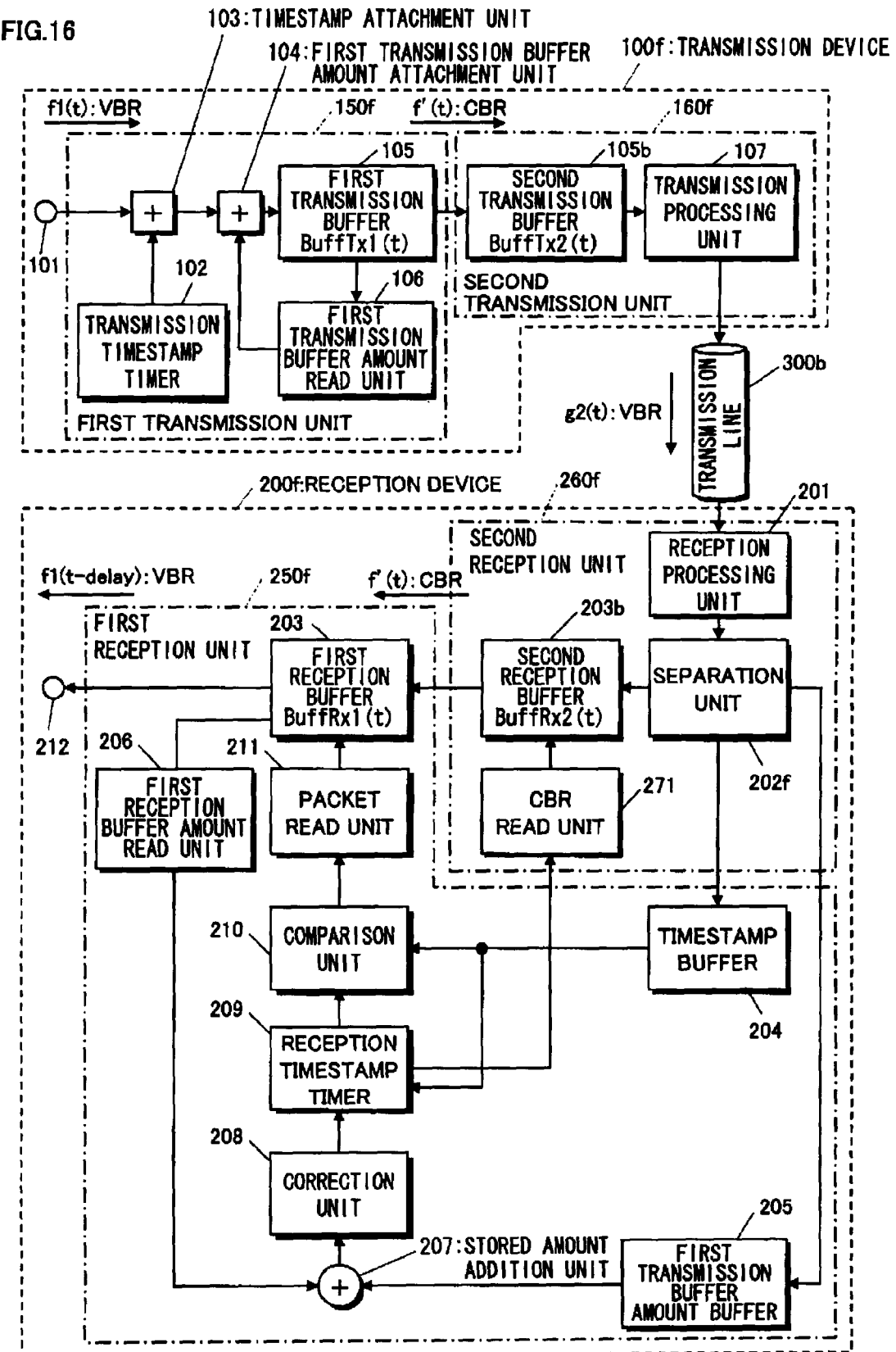
FIG. 16 shows the structure of a synchronous transmission system of embodiment 7.
Figure 17:
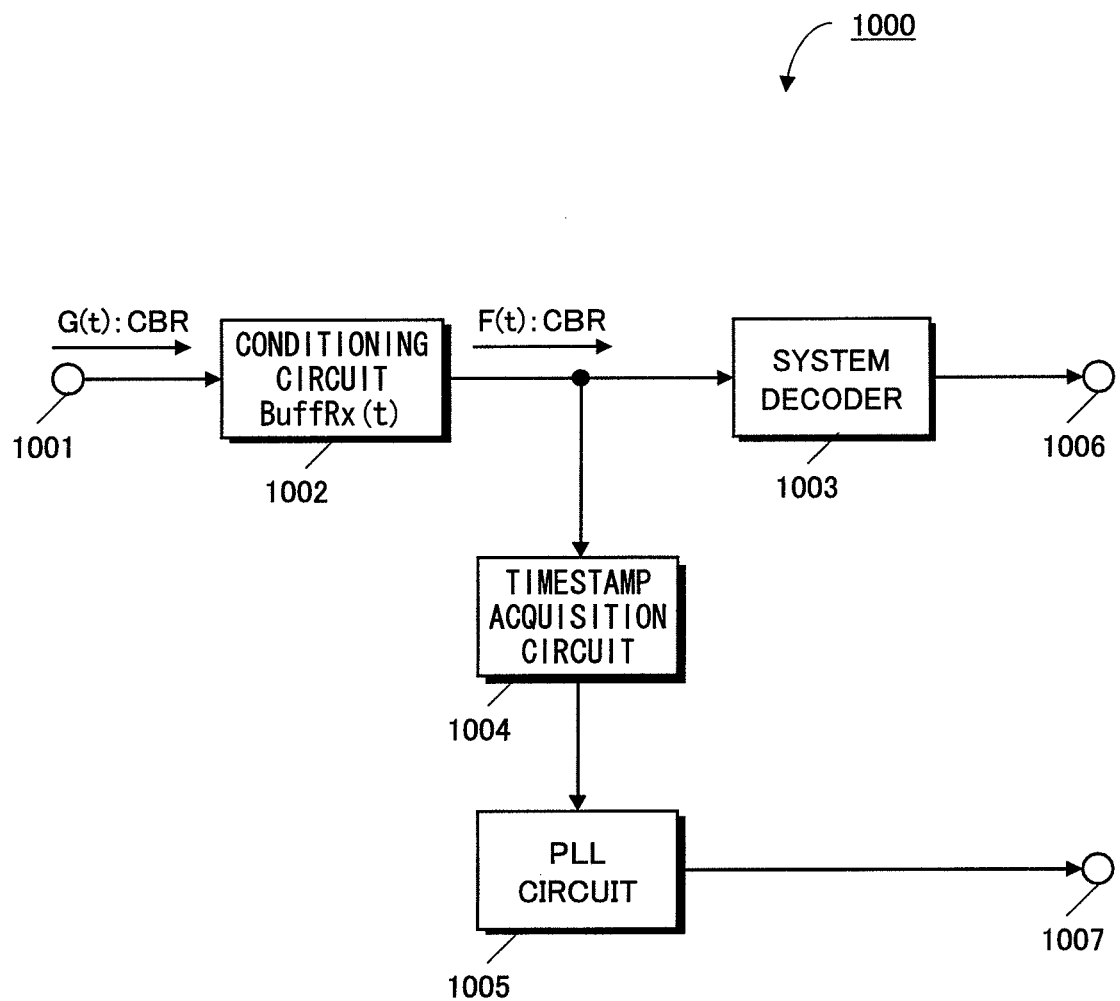
FIG. 17 shows the structure of a reception device that realizes conventional synchronous transmission.
Figure 18A:
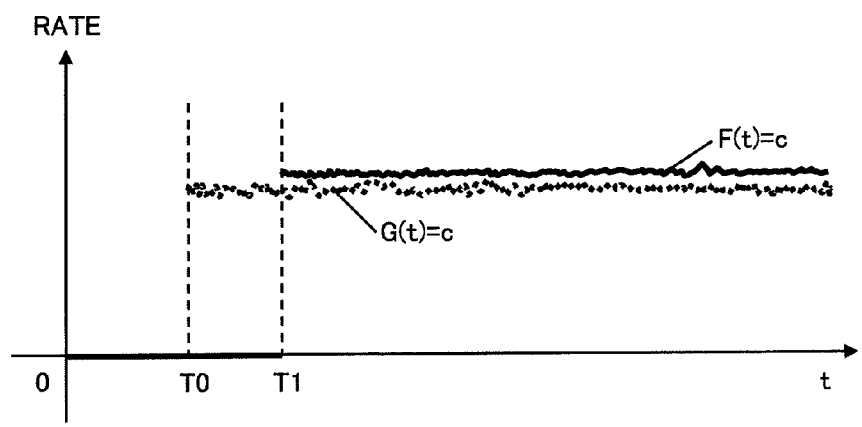
FIGS. 18A and 18B show changes in input/output bit rate of packets to a buffer and stored amount of packets in a buffer over time in conventional technology.
Figure 18B:
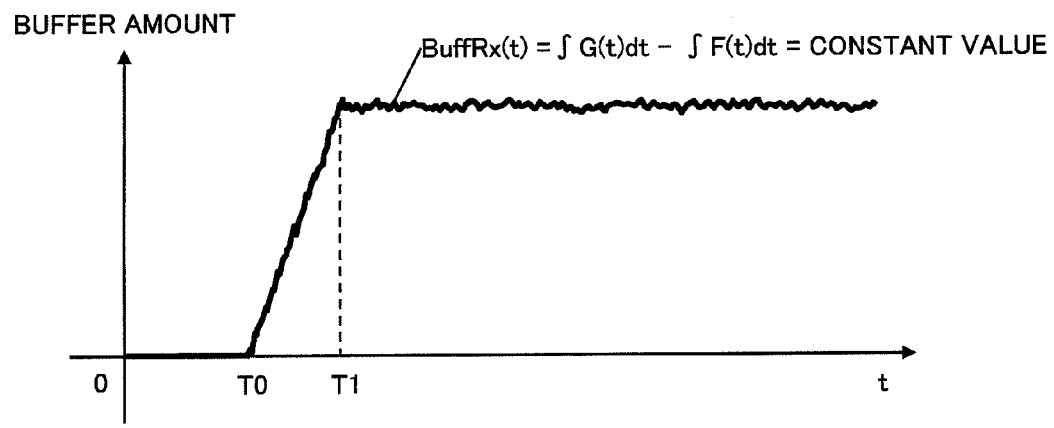
Figure 19A:
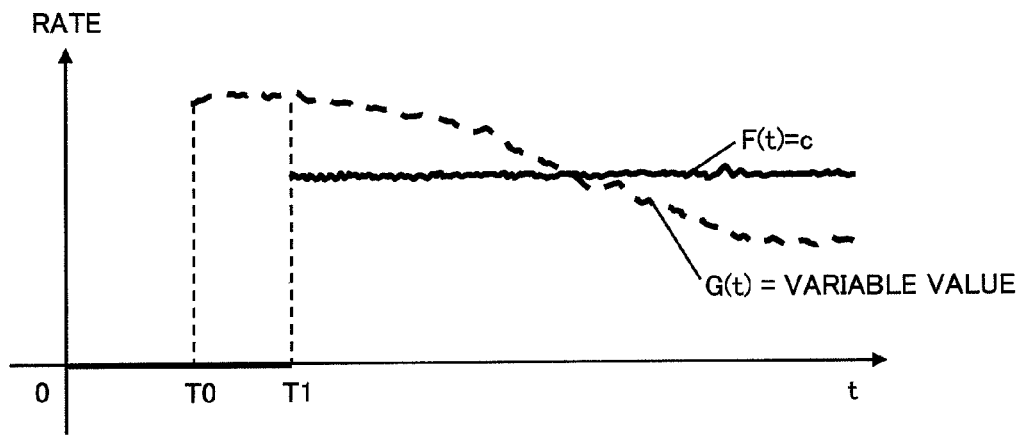
FIGS. 19A and 19B show changes in input/output bit rate of packets to a buffer and stored amount of packets in a buffer over time, to illustrate a problem in conventional technology.
Figure 19B:
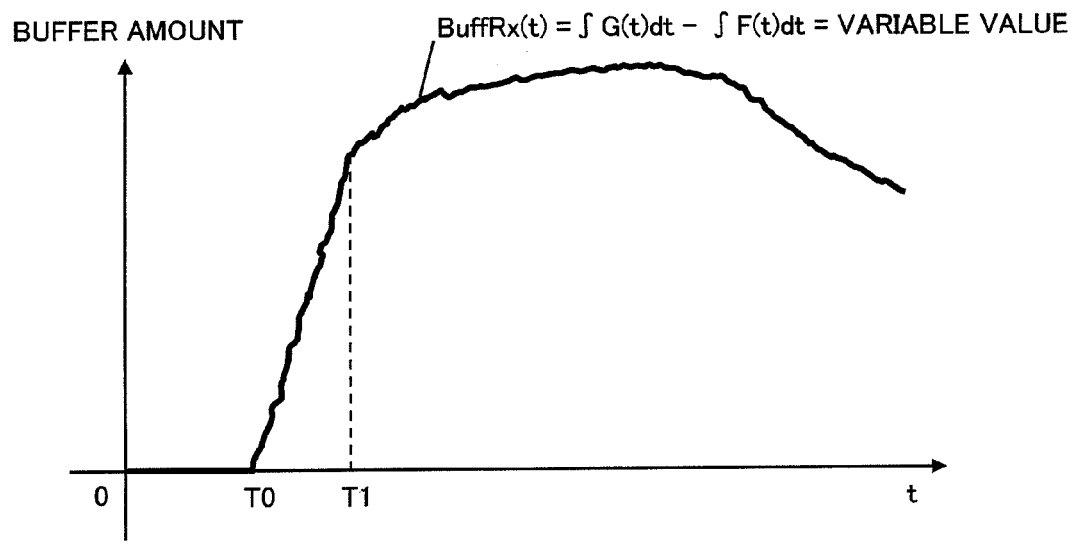

The following describes the structure of the synchronous transmission system of the present embodiment with reference to FIG. 16. FIG. 16 shows the structure of the synchronous transmission system of the present embodiment.

A transmission device 100f and a reception device 200f transmit and receive packets via the transmission line 300b.

Transmission Device

The transmission device 100f includes the input terminal 101, a first transmission unit 150f that has the same structure as the first transmission unit 150e of embodiment 5, and a second transmission unit 160f.

The second transmission unit 160f includes the second transmission buffer 105b and the transmission processing unit 107.

In the transmission device 100e, when a packet is input to the input terminal 101, the timestamp attachment unit 103 attaches a count value supplied from the transmission timestamp timer 102 to the beginning of the input packet as a timestamp, and furthermore, the first transmission buffer amount attachment unit 104 attaches a first transmission buffer amount read by the first transmission buffer amount read unit 106 to the beginning of the packet having the timestamp attached thereto. The packet having the timestamp and first transmission buffer amount attached thereto is stored in the first transmission buffer 105.

The packet that is stored in the first transmission buffer 105 is output at a constant bit rate, and stored in the second transmission buffer 105b. Control for outputting packets from the first transmission buffer 105 at a constant bit rate is realized by, in the exemplary case of an MPEG2 TS, extracting the stream rate from the stream header, and outputting the packets at a stream rate obtained by adding the extracted stream rate and the rate corresponding to the timestamps attached to the input packets and the rate corresponding to the overhead data of the first transmission buffer amount.

The second transmission buffer 105b outputs a joined packet composed of a plurality of packets that have been joined together, and the transmission processing unit 107 performs predetermined processing on the joined packet and outputs the resulting packet to the transmission line 300b.

Reception Device

The reception device 200f includes a second reception unit 260f, a first reception unit 250f, and the input terminal 221.

The second reception unit 260f includes the reception processing unit 201, a separation unit 202f, a CBR read unit 271, and the second reception buffer 203b.

The separation unit 202f receives a joined packet from the reception processing unit 201, and separates the received joined packet into a plurality of first transmission buffer amounts, a plurality of timestamps, and a plurality of packets. The separation unit 202f outputs the first transmission buffer amounts, timestamps, and packets to the first transmission buffer amount buffer 205, timestamp buffer 204, and second reception buffer 203b respectively.

The CBR read unit 271 includes a counter that counts the clock signal supplied from the reception timestamp timer 209, and generates a read signal upon counting a certain number of clock signals. Upon receiving the read signal, the second reception buffer 203b outputs one stored packet to the first reception buffer 203.

The frequency of the clock signal input to the CBR read unit 271 from the reception timestamp timer 209 has been adjusted to be the same as the frequency of the oscillator 102a in the transmission timestamp timer 102. As such, in the present embodiment there is no need to perform rate control processing with use of the stored amount of packets in the second transmission buffer 105b and the stored amount of packets in the second reception buffer 203b.

Note that the second reception unit 260f does not perform time-base recovery processing because it is sufficient for time-base recovery to be performed on packets that are output from the first reception buffer 203.

The first reception unit 250f has the same structure as the first reception unit 250 of embodiment 5, and performs time-base recovery processing and rate control processing. The clock signal generated by the variable frequency oscillator 209 in the reception timestamp timer 209 is output to the CBR read unit 271 via the clock output terminal 209f.

A description of the time-base recovery processing and rate control processing performed by the first reception unit 250f has been omitted since they are the same as the time-base recovery processing and rate control processing performed by the first reception unit 250 of embodiment 5.

The present embodiment as described above enables realizing synchronous transmission between a transmission device and a reception device that have a simpler structure than embodiment 5, even if the input bit rate at which packets are input to the transmission device is a variable bit rate and the transmission bit rate on the transmission line is a variable bit rate.

Supplementary Remarks (1) In the above-described embodiments, the input packets may be packets relating to an MPEG2 TS.

(2) In the above-described embodiments, the stored amount of packets in the transmission buffer (the first transmission buffer 105 or second transmission buffer) is transmitted from the transmission device to the reception device, and is used in adjusting the counting speed of the counter included in the reception device. However, the present invention is not limited to this. The information that is transmitted from the transmission device to the reception device may be any information that enables specifying the stored amount of packets in the transmission buffer.

For example, the stored amount of packets in the transmission buffer is equivalent with a value obtained by subtracting the time integration value of the rate at which packets are output from the transmission buffer from the time integration value of the rate at which packets are input to the transmission buffer.

Similarly, the stored amount of packets in the reception buffer (the first reception buffer 203 or the second reception buffer 203b) is equivalent with a value obtained by subtracting the time integration value of the rate at which packets are output from the reception buffer from the time integration value of the rate at which packets are input to the reception buffer.

Therefore, the values equal to the stored amounts of packets in the transmission buffer and reception buffer may be calculated with use of input/output rates, and the counting speed of the counter may be adjusted so that the sum of the calculated values is constant.

In view of this, instead of transmitting the stored amount of packets in the transmission buffer to the reception device, the transmission device may measure the input and output rates with respect to the transmission buffer, and transmit the measured input and output rates to the reception device. In such a case, the reception device measures the input and output rates with respect to the reception buffer.

Note that since the time integration value of the rate of output from the transmission buffer is the same as the time integration value of the rate of input to the reception buffer, these two time integration values cancel each other out when adding the values equal to the stored amounts of packets in the transmission buffer and reception buffer. For this reason, it is sufficient for only the rate of input to the transmission buffer to be transmitted to the reception device, and for the reception device to only measure the rate of output from the reception buffer.

(3) The present invention may be reception methods for performing processing equivalent to the functions of part or all of the constituent elements in the above-described embodiments.

Alternatively, the present invention may be programs that describe processing equivalent to the functions of part or all of the constituent elements in the above-described embodiments, where the programs are stored in memory and executed by a CPU etc.

INDUSTRIAL APPLICABILITY

The present invention can be used in synchronous transmission between a transmission device and a reception device, is useful in applications such as high definition video transmission over a home network, and is applicable to stream transmission over a global network such as the Internet.

The invention claimed is:

1. A reception device comprising:
a reception unit configured to receive, from a transmission device, a packet and first transmission storage information related to the packet, the packet being included in a series of packets carrying a data stream, the series of packets being input to a first transmission buffer unit included in the transmission device at a first variable bit rate, the series of packets being output from the first transmission buffer unit at a constant bit rate, and the first transmission storage information being information indicating a first stored amount which is an amount of the series of packets stored in the first transmission buffer unit at a time of inputting the packet to the first transmission buffer unit;
a reception counter unit configured to count a clock signal at a counting speed that is controllable;
a first reception buffer unit configured to temporarily store the packet included in the series of packets, the series of packets being input to the first reception buffer unit at the constant bit rate, and the series of packets being output from the first reception buffer unit at the first variable bit rate; and
a correction unit configured (i) to calculate a sum of the first stored amount and a second stored amount which is an amount of the series of packets stored in the first reception buffer unit at a time of outputting the packet from the first reception buffer unit, and (ii) to control the counting speed of the reception counter unit based on the sum of the first stored amount and the second stored amount,
wherein the reception unit further receives second transmission storage information related to the packet included in the series of packets, the series of packets being temporarily stored in a second transmission buffer unit included in the transmission device after being outputted from the first transmission buffer unit, the series of packets being input to the second transmission buffer unit at the constant bit rate, the series of packets being output from the second transmission buffer unit at a second variable bit rate, the second transmission storage information indicating a third stored amount which is an amount of the series of packets stored in a second transmission buffer unit at a time of outputting the packet from the second transmission buffer unit,
wherein the reception device further comprises
a second reception buffer unit configured to temporarily store the packet included in the series of packets before the packet is stored in the first reception buffer unit, the series of packets being input to the second reception buffer unit at the second variable bit rate, the series of packets being output from the second reception buffer unit at the constant bit rate, and
wherein the correction unit (i) calculates a sum of the third stored amount and a fourth stored amount which is an amount of the series of packets stored in the second reception buffer unit at a time of inputting the packet to the second reception buffer unit, and (ii) controls the counting speed of the reception counter unit based on the sum of the third stored amount and fourth stored amount.

* * * * *